(12) United States Patent
Ringuette

(10) Patent No.: US 8,117,870 B2
(45) Date of Patent: Feb. 21, 2012

(54) LONG STROKE BLOW HEAD MECHANISM

(75) Inventor: Timothy A. Ringuette, Unionville, CT (US)

(73) Assignee: Emhart Glass S.A., Cham (CH)

( * ) Notice: Subject to any disclaimer, the term of this patent is extended or adjusted under 35 U.S.C. 154(b) by 44 days.

(21) Appl. No.: 12/565,987

(22) Filed: Sep. 24, 2009

(65) Prior Publication Data

US 2011/0067449 A1   Mar. 24, 2011

(51) Int. Cl.
*C03B 9/00* (2006.01)
*C03B 9/03* (2006.01)
*C03B 9/34* (2006.01)
*C03B 9/36* (2006.01)

(52) U.S. Cl. ............................................. 65/261; 65/82
(58) Field of Classification Search ...................... 65/261
See application file for complete search history.

(56) References Cited

U.S. PATENT DOCUMENTS

| | | | |
|---|---|---|---|
| 1,945,983 A * | 2/1934 | Rowe | ................................. 65/75 |
| 2,309,290 A | 1/1943 | Aksomitas | |
| 4,508,557 A | 4/1985 | Fenton | |
| 4,579,575 A | 4/1986 | Foster | |
| 4,726,833 A | 2/1988 | Foster | |
| 4,892,183 A | 1/1990 | Fenton | |
| 5,807,419 A | 9/1998 | Rodriguez-Wong et al. | |
| 2003/0221456 A1 | 12/2003 | Leidy et al. | |
| 2008/0000268 A1 | 1/2008 | Hyre et al. | |
| 2008/0141722 A1 * | 6/2008 | Voisine et al. | .................. 65/348 |

FOREIGN PATENT DOCUMENTS

DE   10310990 A1   9/2004

\* cited by examiner

*Primary Examiner* — Matthew Daniels
*Assistant Examiner* — Cynthia Szewczyk
(74) *Attorney, Agent, or Firm* — Reinhart Boerner Van Deuren s.c.

(57) ABSTRACT

An improved and mechanically simplified blow head mechanism for blowing a parison and internally cooling the blown parison is disclosed which may be used with an I.S. machine to blow a parison to form a glass container and then internally cool the blown parison below the annealing point. The blow head mechanism has a cooling tube which supplies final blow and cooling air and which is raised or lowered by raising or lowering the blow head mechanism. The blow head mechanism supports a blow head with a pressurized cylinder which maintains the blow head in a position in engagement with the finish of a parison once initially lowered irrespective of the blow head mechanism being further lowered to lower the cooling tube into the blown parison.

18 Claims, 20 Drawing Sheets

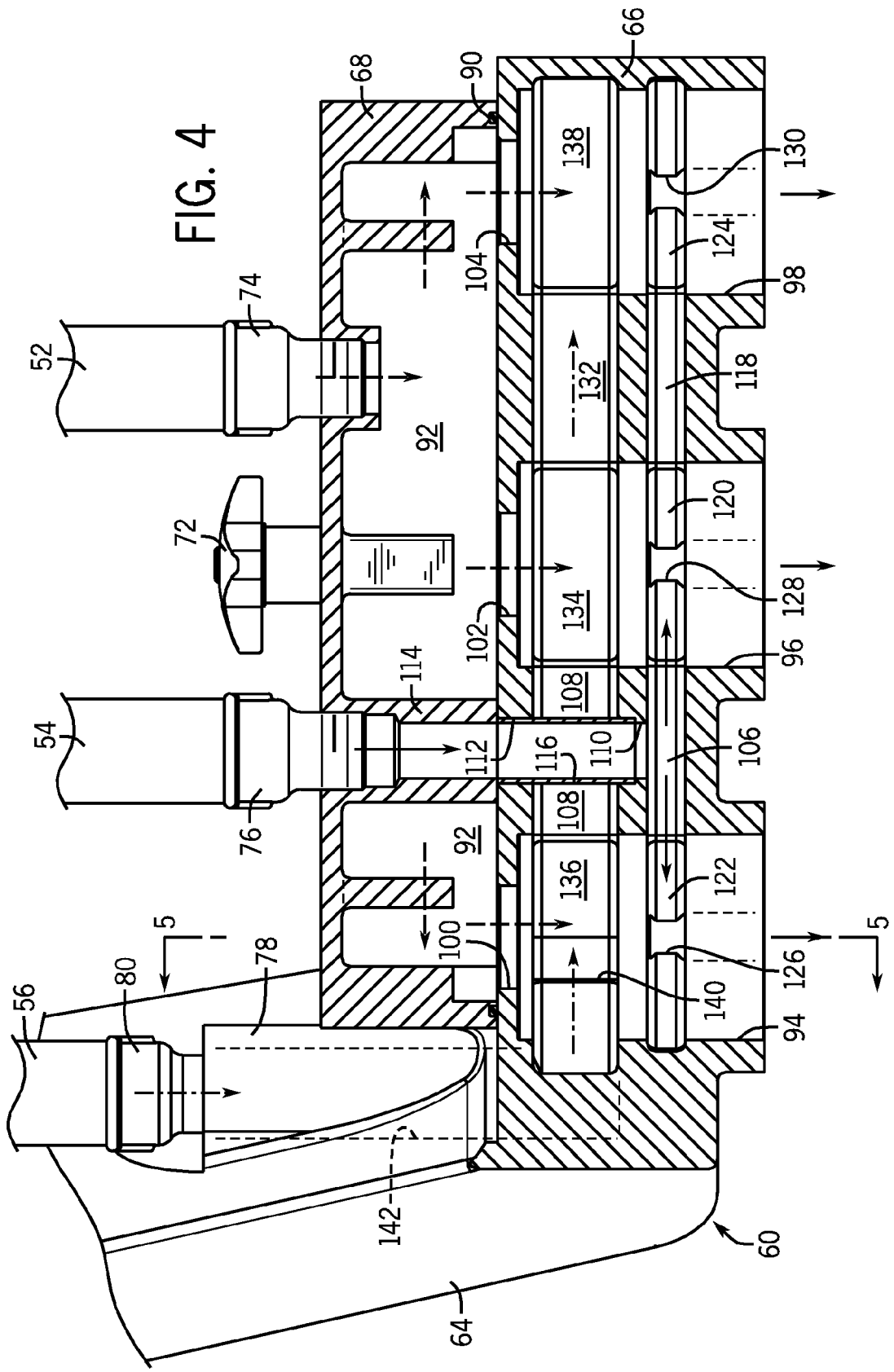

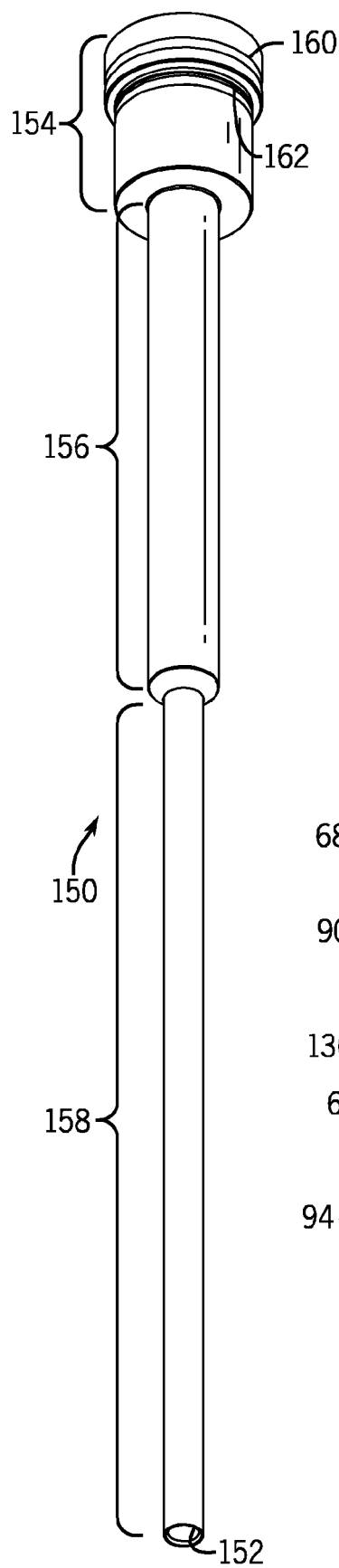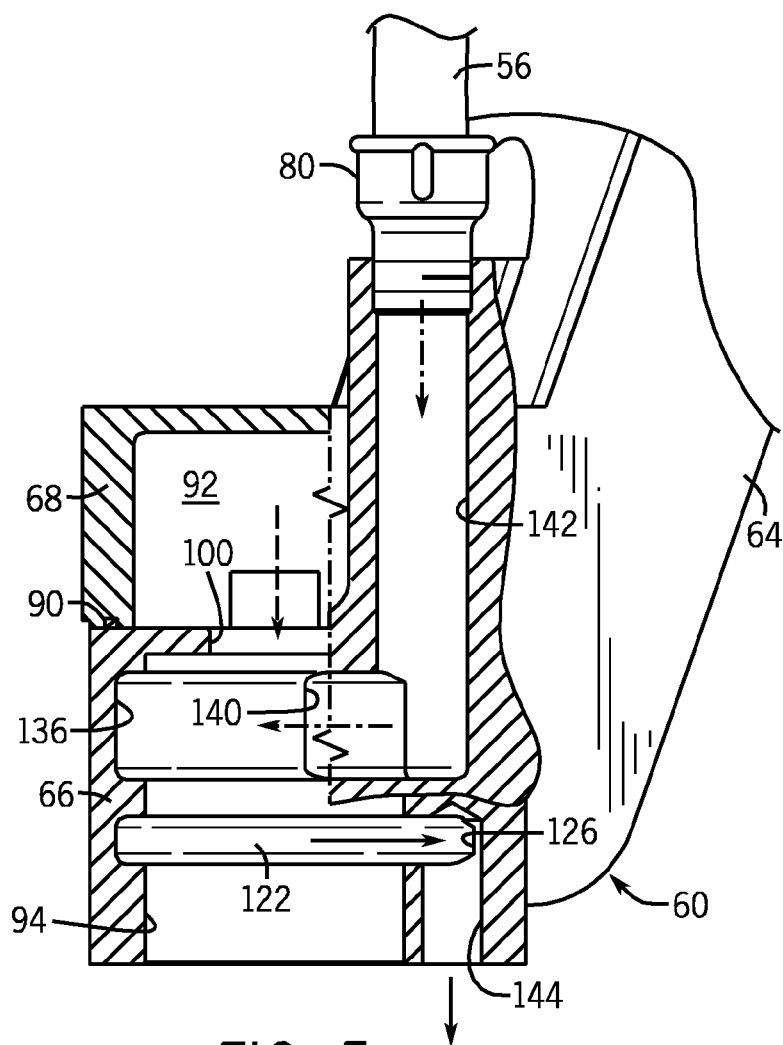

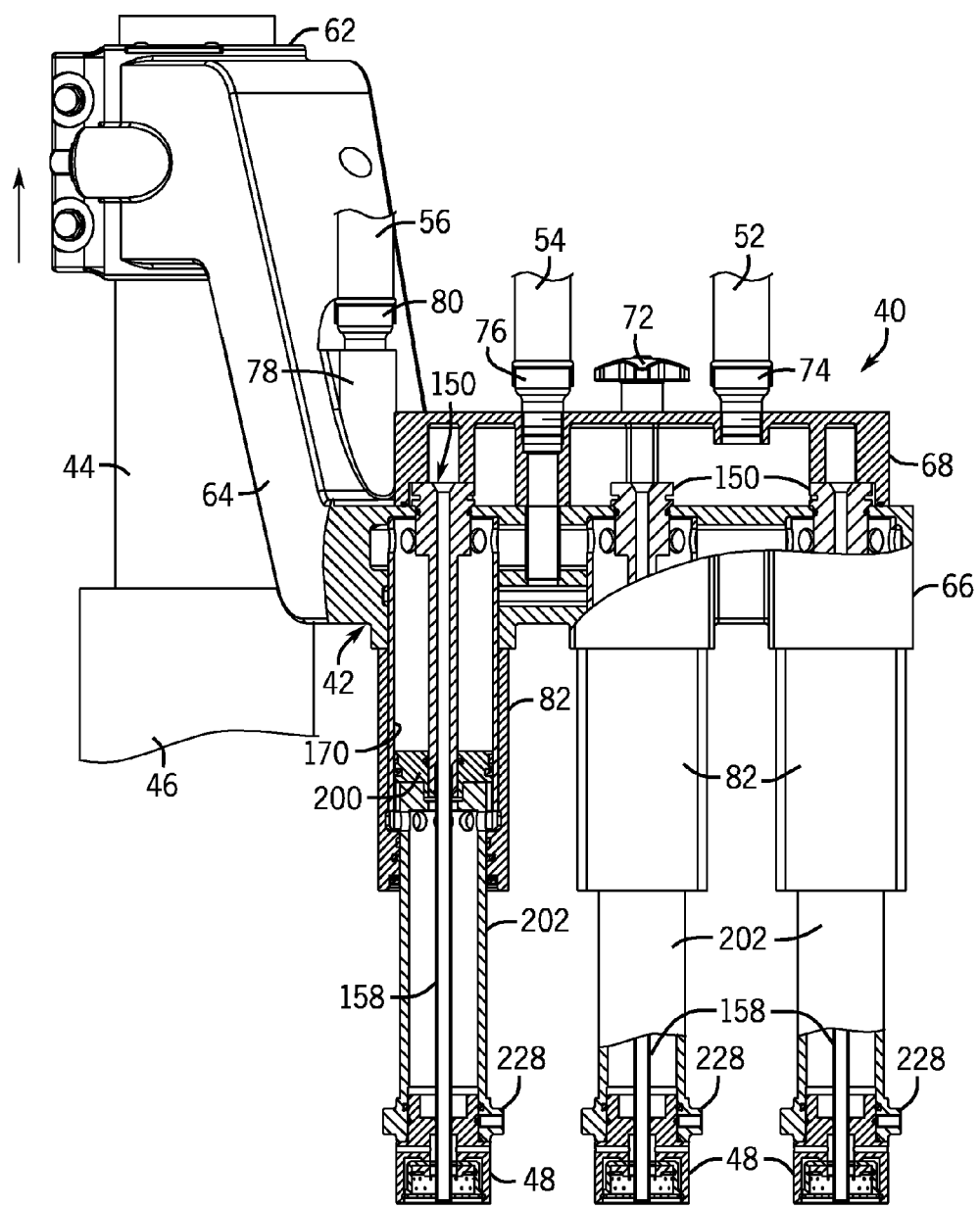
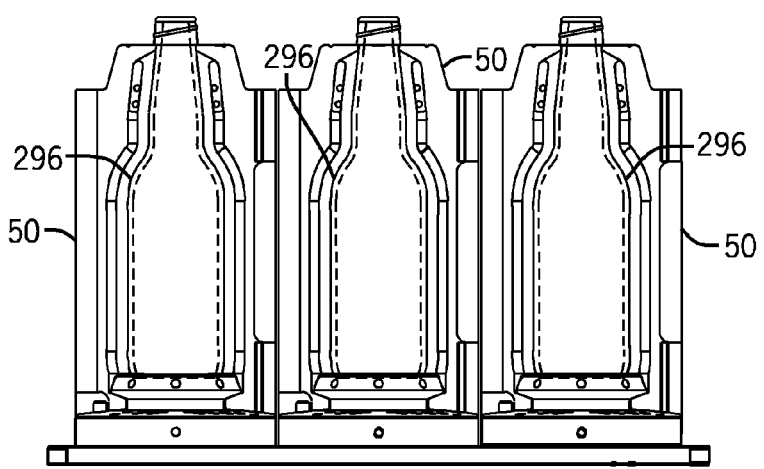
FIG. 22

LONG STROKE BLOW HEAD MECHANISM

BACKGROUND OF THE INVENTION

Field of the Invention

The present invention relates generally to Individual Section ("I.S.") glass forming machines which form a parison at a blank station and subsequently blow the parison and then cool the blown parison at a blow station below the annealing point to form a glass container, and more particularly to an improved and mechanically simplified blow head for blowing a parison and internally cooling the blown parison.

Glass containers are made in a manufacturing process that has three distinct operations, namely the batch house, the hot end, and the cold end. The batch house is where the raw materials for glass (which are typically sand, soda ash, limestone, feldspar, cullet (crushed, recycled glass), and other raw materials) are prepared and mixed into batches. The hot end begins with a furnace, in which the batched materials are melted into molten glass, and from which a stream of molten glass flows.

The molten glass is cut with a shearing blade into uniform segments of glass called gobs, which fall by gravity and are guided through troughs and chutes into blank molds. In the blank molds, a pre-container referred to as a parison is formed, either by using a metal plunger to push the glass into the blank mold, or by blowing the glass out from below into the blank mold. The parison is inverted and transferred to a mold, where the parison is blown out into the shape of the container. Typically, the manufacturing process is performed in an Individual Section or IS forming machine, which contains between five and twenty identical sections, each of which is capable of making one, two, three, or four containers simultaneously.

The hot end also includes an annealing process which prevents the containers from having weakened glass caused by stresses caused by uneven cooling. The annealing process is used to achieve even cooling, using an annealing oven or Lehr to heat the containers, and then slowly cool them over a twenty to sixty minute period. If the containers are to be used for certain uses such as containing alcoholic spirits, an internal treatment or dealkalization is typically performed prior to annealing to render the container more resistant to alkali extraction.

The role of the cold end of the glass container manufacturing process is inspection of the containers to ensure that they are of acceptable quality. All glass containers are inspected by automated machines after manufacturing for a variety of faults, typically including small cracks in the glass referred to as checks, foreign inclusions referred to as stones, bubbles in the glass referred to as blisters, and excessively thin walls. In addition, inspectors carry out a number of checks manually on samples of the containers, which commonly include visual and dimensional checks.

The focus of the present invention is on the blow station where an apparatus is used to blow a parison and then cool the blown parison to form a glass container. The parison is removed from a blank mold where it was formed by an invert mechanism which inverts the parison to a right-side-up orientation, and places the parison into a blow mold with its finish (the portion of the parison located above its neck) extending from the top of the blow mold. A blow head is brought into position on top of the blow mold at the blow station to engage the parison's finish, and the blow head provides air under pressure (referred to as "final blow" air) through a blow tube extending from the blow head downwardly into the interior of the parison at the top end thereof to blow the parison into contact with the interior of the blow mold, thereby creating a blown parison with the morphology of the interior of the blow mold.

The blown parison is then cooled to the point where it is sufficiently rigid to be gripped and removed from the blow station by a takeout mechanism without sagging or otherwise becoming deformed. The outer surface of the blown parison is cooled by cooling the blow mold and the inner surface of the blown parison is cooled by internal cooling air which flows through the blow tube into the blown parison. The cooling air escapes from the interior of the bottle through a permanently open adjustable exhaust in the blow head. An example of a conventional blow head is found in U.S. Pat. No. 4,726,833, to Foster, and a functional description of the operation of a blow head having a moveable blow tube is found in U.S. Patent Application Publication No. 2008-0000268, to Hyre et al., both of which are hereby incorporated herein by reference.

As described in the Hyre et al. patent application, following the parison being blown, the blow head is raised slightly above the finish of the blown parison and cooling air is supplied to the blow tube, typically at a higher pressure than the pressure of the final blow air. The cooling tube may be extended downwardly from the blow head to lower it further into the blown parison to a "down" position to direct more cooling air into the body and the bottom of the blown parison, both of which contain more glass material than the neck of the blown parison and both of which thus require more cooling. External cooling will be effected on the blown parison by blowing additional cooling air through a series of circumferentially located cooling holes located in the blow mold.

As shown in the Hyre et al. patent application, a blow head arm carrying multiple blow heads is mounted on a vertical post and is coupled to an electronic (servo) motor that drives the blow head arm and the blow heads up and down. This up and down movement of the blow head arm causes the blow heads to be displaced between an advanced "on" position in which the blow heads each engage a parison's finish, a slightly raised "cooling" or "escape" position in which the blow heads are raised slightly above the finish of each blown parison and cooling air is supplied to the blown parisons through a blow tube in each of the blow heads, and a retracted "off" position in which the blow heads are retracted from the blown parisons.

The cooling tubes of the blow head mechanism shown in the Hyre et al. patent application are independently actuated by a complex electromechanical system mounted on the blow head arm. Each of the blow tubes has an externally threaded top end portion that is received within a separate geared drive member having a threaded internal diameter that receives the externally threaded top end portion of one of the blow tubes. Rotation of these drive members thus will cause the blow tubes to be raised and lowered. The drive members are driven by a series of gears including a drive gear and an idler gear, with the drive gear being rotated by an electronic (servo) motor that is coupled thereto. Those skilled in the art will appreciate the mechanical complexity of this cooling tube actuation system, which complexity inherently has a relatively high cost of manufacture as well as a significant cost of maintenance.

It will thus be appreciated that it would be desirable for the present invention to provide a functionally equivalent blow head mechanism that has a substantially reduced mechanical complexity. In this regard, it would also be desirable to entirely eliminate the need for the motor and its accompanying mechanical drive mechanism presently located on the blow head arm and used to raise and lower cooling tubes. However, while eliminating the motorized drive mechanism on the blow head arm, it is essential that all of the functionality such a motorized drive mechanism be retained and further enhanced to the degree possible.

It is also desirable that the present invention facilitate the movement of the cooling tube into a glass container after it is blown to enhance the cooling of the blown glass container. It is also desirable that during such movement of the cooling tube that a uniform force be maintained by the blow head on the blow mold to keep the blow head engaged with the finish of the glass container to continue cooling it without placing undue stress on it as the cooling tube is lowered into the glass container. It is further desirable that despite the inclusion of such functionality the present invention retain simplicity of operation as well as that it be of relatively compact size.

The apparatus of the present invention should also be of construction which is both durable and long lasting, and it should also require little or no maintenance to be provided by the user throughout its operating lifetime. In order to enhance the market appeal of the apparatus of the present invention, it should also be of inexpensive construction to thereby afford it the broadest possible market. Finally, it is also desirable that all of the aforesaid advantages and objectives be achieved without incurring any substantial relative disadvantage.

SUMMARY OF THE INVENTION

The disadvantages and limitations of the background art discussed above are overcome by the present invention. With this invention, a long stroke blow head mechanism is used that has at least one blow head supported therefrom for use in blowing a parison in a blow mold. The blow head arm has a blow head arm that has at least three vertical positions. The blow head arm has a first position in which the blow head is located above the finish of a parison located in a blow mold, a second position in which the blow head is located on the blow mold and is engaged with the finish of the parison in the blow mold with the lower or distal end of a cooling tube located in the blow head to blow the parison, and a third position in which the blow head remains on the blow mold and engaged with the finish of the parison in the blow mold but the distal end of the cooling tube descends below the blow head into the blown parison to cool it.

The cooling tube is mounted on the blow head arm, and the distal end of the blow tube thus moves together with the blow head arm as the blow head arm is raised or lowered. Thus, as the blow head arm is lowered from its first position to its second position, and from its second position to its third position, the blow tube, including its distal end, is lowered the same amount.

The blow head is supported from the blow head arm with a pneumatic support apparatus that urges the blow head downwardly between a range of positions. When the blow head arm is in its first position, the blow head is in its furthest downward position with respect to the blow head arm (and the distal end of the cooling tube is within the blow head proximate the bottom of the blow head)

When the blow head arm is lowered to its second position, the blow head is lowered onto the blow mold to engage the finish of the parison in the blow mold. Since both the blow head arm and the blow head have dropped by the same amount (and the distal end of the cooling tube has dropped by the same amount and thus is still proximate the bottom of the blow head), the blow head remains in its furthest downward position with respect to the blow head arm.

As the blow head arm is lowered below its second position (towards its third position), the blow head cannot move to a lower position since it is already in contact with the blow mold and engaged with the finish of the parison in the blow mold. Since the blow head is supported from the blow head arm with a pneumatic support apparatus, it will remain in position as the blow head arm continues to be lowered. The pneumatic support apparatus will continue to maintain the blow head on the blow mold and engaged with the finish of the parison with the same pressure, namely the pressure of the pneumatic support apparatus.

In the preferred embodiment, the pneumatic support apparatus is a cylinder mounted on the blow head arm, with a piston located in the cylinder being used to support the blow head below the piston. The piston is moveable between a lower position and a higher position, and is biased by air pressure from the higher position toward the lower position. Thus, as the blow head arm is lowered from its second position to its third position, the blow head will remain on the blow mold and engaged with the finish of the parison while the cooling tube is lowered into the parison, with the entire movement of both the blow head and the cooling tube being controlled by moving the blow head arm up and down. Preferably, the cooling tube can be lowered into the blown parison some distance to aid in cooling the interior of the blown parison.

It may therefore be seen that the present invention teaches a long stroke blow head mechanism that has a substantially reduced mechanical complexity. In this regard, the long stroke blow head mechanism of the present invention entirely eliminates the need for the motor and its accompanying mechanical drive mechanism on the blow head arm to raise and lower cooling tubes. In doing so, the long stroke blow head mechanism of the present invention retains all of the functionality of such motorized drive mechanisms.

The long stroke blow head mechanism of the present invention facilitates movement of the cooling tube into a glass container after it is blown to enhance the cooling of the blown glass container. During such movement of the cooling tube, the long stroke blow head mechanism of the present invention maintains a uniform force on the blow head to keep it on the blow mold and engaged with the finish of the glass container to continue cooling it without placing undue stress on it as the cooling tube is lowered into the glass container. Despite the inclusion of such functionality, the long stroke blow head mechanism of the present invention features simplicity of operation while being of relatively compact size.

The long stroke blow head mechanism of the present invention is of a construction which is both durable and long lasting, and which will require little or no maintenance to be provided by the user throughout its operating lifetime. The long stroke blow head mechanism of the present invention is also of inexpensive construction relative to previously known apparatus of its kind to enhance its market appeal and to thereby afford it the broadest possible market. Finally, all of the aforesaid advantages of the long stroke blow head mechanism of the present invention are achieved without incurring any substantial relative disadvantage.

DESCRIPTION OF THE DRAWINGS

These and other advantages of the present invention are best understood with reference to the drawings, in which:

FIG. 4 is a longitudinal cross-sectional plan view of the blow head arm illustrated in FIGS. 2 and 3, showing air passages located therein and three extension sockets used to provide air to the air passages;

FIG. 5 is a lateral cross-sectional view of the blow head arm illustrated in FIGS. 2 through 4 along the center of the blow head location closest to the mounting point of the blow head arm, showing the air passages and particularly an air passage located at the rear of the blow head arm;

FIG. 6 is an isometric view of a hollow cooling tube from the side and slightly below;

FIG. 22 is a figure similar to the one illustrated in FIG. 21, with the blow head arm raised to a sixth position identical to its position as illustrated in FIG. 16 with the blow heads being located above the respective finishes of the blown parisons.

DETAILED DESCRIPTION OF THE EXEMPLARY EMBODIMENT

Figure 1:
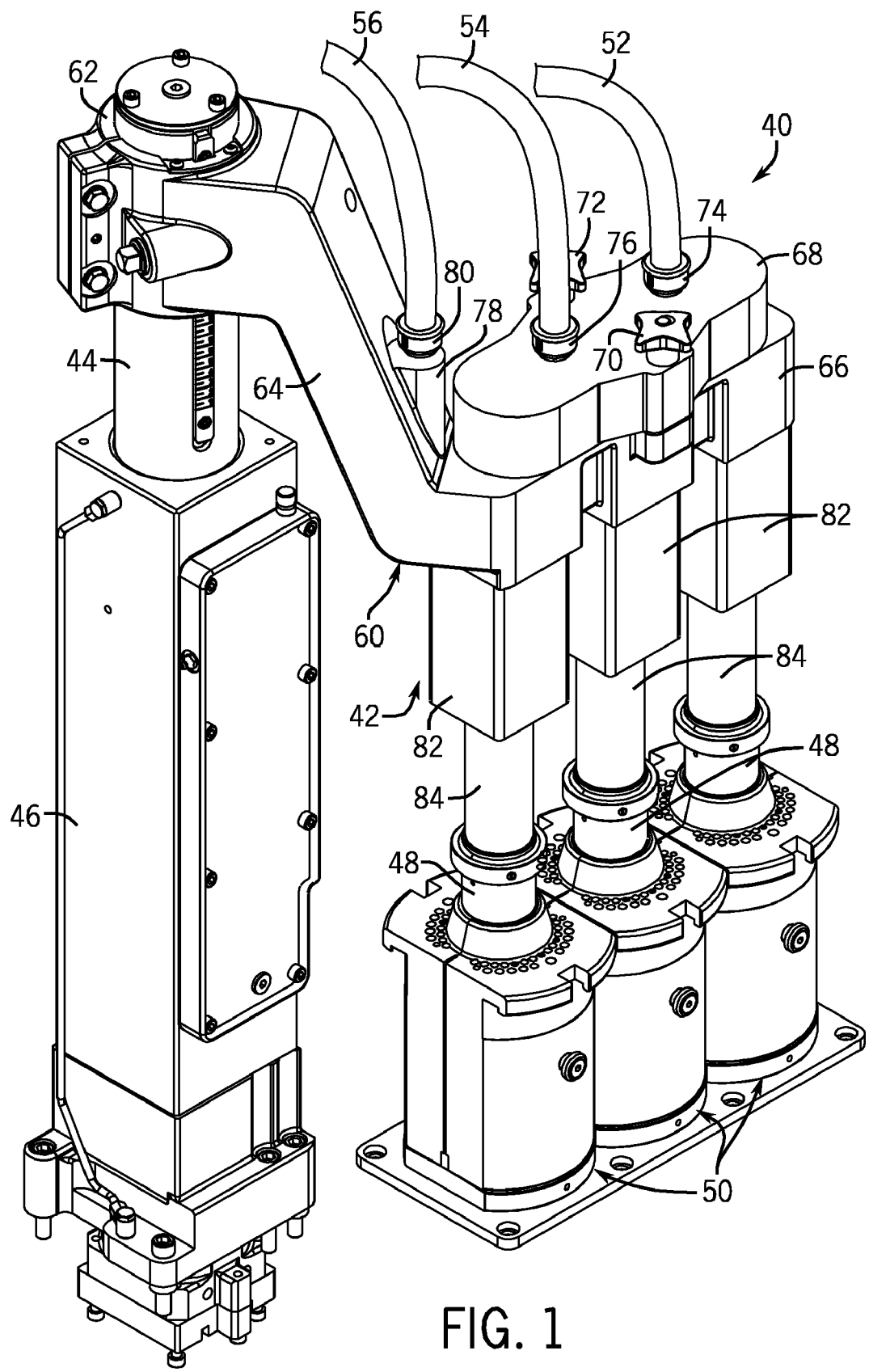
FIG. 1 is an isometric view of a long stroke blow head mechanism taught by the present invention with a blow head arm mounted on a vertical post positioned by a blow head lift mechanism, with blow heads on the blow head arm being shown positioned on blow molds.

An exemplary embodiment of the present invention is illustrated in the drawings, with FIG. 1 showing a long stroke blow head mechanism 40 having a blow head arm assembly 42 mounted on a vertical post 44 that is operated by a blow head lift mechanism 46. Extending from the bottom of the blow head arm assembly 42 are three blow heads 48 that are shown located on top of three blow molds 50. The blow head arm assembly 42 is operated by a servo motor mechanism (not shown herein) located in the blow head lift mechanism 46 which selectively raises and lowers the vertical post 44 to raise and lower the position of the blow head arm assembly 42 with respect to the blow molds 50, with a conventional cam mechanism (not shown herein) which is also located in the blow head lift mechanism 46 being used to rotate the vertical post 44 to move the blow head arm assembly 42 between a position above the blow molds 50 and a position rotated away from the position above the blow molds 50. The blow head lift mechanism 46 is preferably operated by an automatic control system (not shown herein).

It may be seen that three hoses are connected to the blow head arm assembly 42. These hoses are representative of a first pressurized air source 52 that will supply final blow air to blow parisons located in the blow molds 50 as well as cooling air to cool the interiors of blown parisons in the blow molds 50 and a second pressurized air source that will supply finish cooling air to cool the finishes of blown parisons in the blow molds 50, as is conventional in the art. However, the long stroke blow head mechanism of the present invention also includes a third pressurized air source 56 that will supply cylinder pressurizing air to pressurize cylinders (not shown in FIG. 1) located within the blow head arm assembly 42, the purpose of which will become evident in conjunction with the detailed discussion of the construction and operation of the cylinders below.

Figure 2:
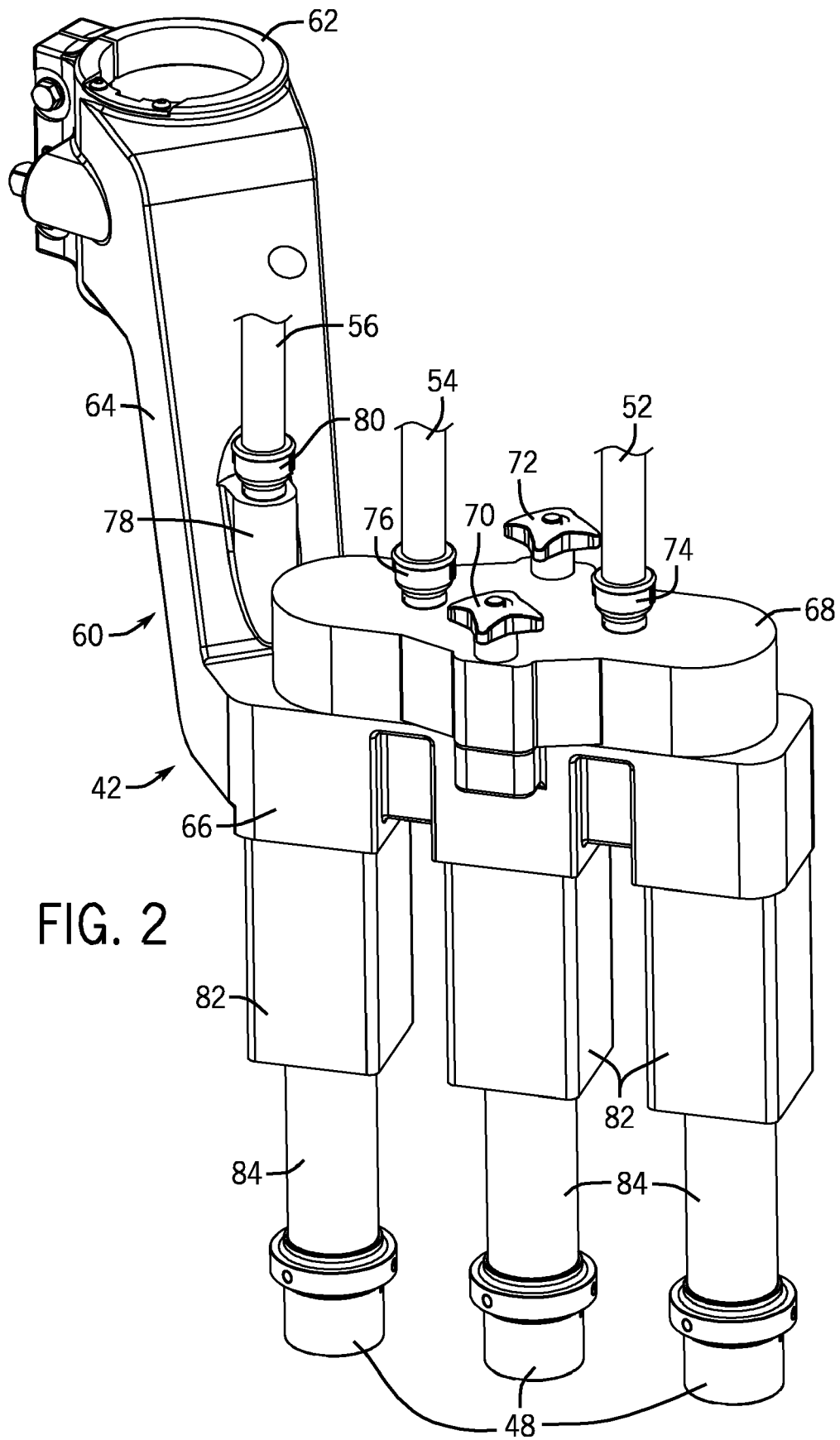
FIG. 2 is an isometric view of the blow head arm and blow heads illustrated in FIG. 1, showing the distal end portions of three air supply hoses that provide pressurized air to the blow head arm.
Figure 3:
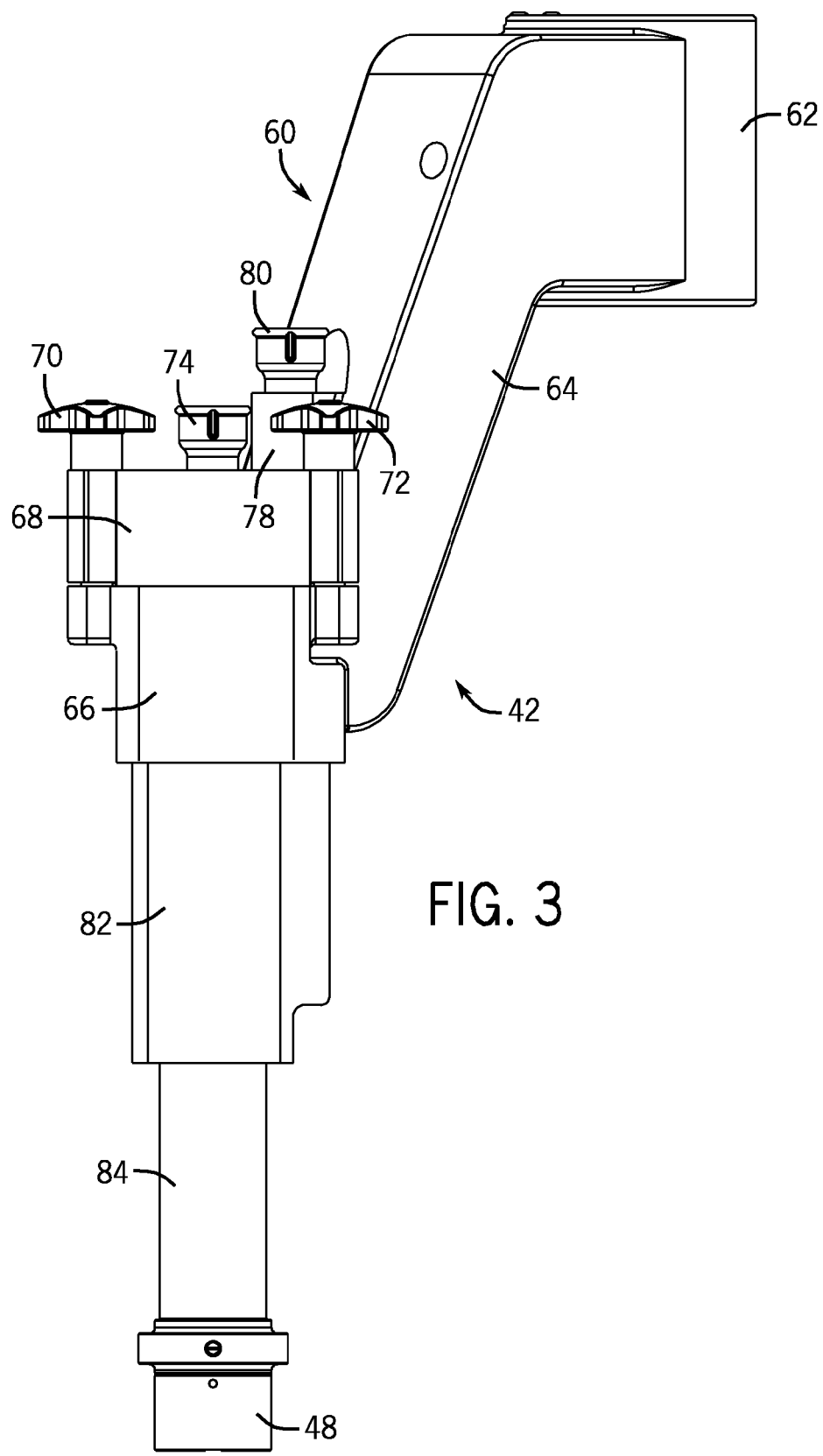
FIG. 3 is an end view of the blow head arm and blow heads illustrated in FIG. 2 from the end of the blow head arm opposite its mounting point.

Referring now to FIGS. 2 and 3 in conjunction with FIG. 1, the external construction of the blow head arm assembly 42 is illustrated. The components of the blow head arm assembly 42 are all assembled onto a blow head arm 60 having a hollow cylindrical mounting ring 62 located on a proximal end thereof. This cylindrical mounting ring 62 is mounted onto the vertical post 44 operated by the blow head lift mechanism 46. Extending outwardly and downwardly from the cylindrical mounting ring 62 is an upper blow head arm member 64, and extending horizontally from the distal end of the upper blow head arm member 64 is a lower blow head arm member 66.

Located on top of the lower blow head arm member 66 is a removable cap 68 that is held in place on the lower blow head arm member 66 with two securing members (not shown in FIGS. 1 through 3) that may be actuated by rotating two grips 70 and 72 that are respectively attached to the two securing members. Extending from the top side of the lower blow head arm member 66 intermediate the half of the cap 68 located over the distal half of the lower blow head arm member is a first extension socket 74 through which the first pressurized air source 52 will supply final blow and cooling air to the blow head arm assembly 42. Extending from the top side of the lower blow head arm member 66 intermediate the half of the cap 68 located over the proximal half of the lower blow head arm member 66 is a second extension socket 76 through which the second pressurized air source 54 will supply finish cooling air to the blow head arm assembly 42.

Located on the upwardly facing side of the upper blow head arm member 64 near its distal end is a boss 78 from which a third extension socket 80 extends. The third pressurized air source 56 will supply cylinder pressurizing air to the blow head arm assembly 42 through the third extension socket 80. It will be appreciated by those skilled in the art that flexible tubing will be used to connect the first pressurized air source 52, the second pressurized air source 54, and the third pressurized air source 56 to the blow head arm 60 to allow the blow head arm 60 to freely move up and down and to rotate on the vertical post 44.

The long stroke blow head mechanism 40 illustrated in FIGS. 1 through 3 has three blow heads 48, and thus there are three sets of identical components extending from the bottom of the blow head arm 60. Since they are identical, each of these sets of components will be provided with the same reference numerals. Located immediately below the lower blow head arm member 66 are the upper or proximal ends of three cylinders 82 each having a roughly rectangular cross-sectional outer configuration. Extending from the bottom or distal end of each of the cylinders 82 is a cylindrical slider 84, and the blow heads 48 are respectively located on the bottom or distal ends of the sliders 84.

Referring next to FIG. 4, three sets of air passages that are located with the interior of the blow head arm 60 and the cap 68 on the top side of the lower blow head arm member 66 are illustrated. Each of these sets of air passages will, when the blow head arm assembly 42 shown in FIGS. 1 through 3 is fully assembled, be used to direct air to selected areas within the blow head arm assembly 42. It should initially be noted that the cap 68 is mounted onto the lower blow head arm member 66 with a seal 90 located therebetween.

A first air passage begins in a first chamber 92 that is defined between the top side of the lower blow head arm member 66 and the interior of the cap 68 mounted thereupon. The first extension socket 74 is screwed into the top of the cap 68 and is in fluid communication with the first chamber 92 to supply final blow and cooling air to the first chamber 92. Three large cylindrical apertures 94, 96, and 98 are located in the bottom side of the lower blow head arm member 66 and extend to locations that are spaced away from the top side of the lower blow head arm member 66. The cylindrical aperture 94 is located hear the proximal end of the lower blow head arm member 66, the cylindrical aperture 98 is located near the distal end of the lower blow head arm member 66, and the cylindrical aperture 96 is located intermediate the cylindrical aperture 94 and the cylindrical aperture 98.

A smaller aperture 100 that is coaxial with the cylindrical aperture 94 is located in the top side of the lower blow head arm member 66 and connects the first chamber 92 and the cylindrical aperture 94. A smaller aperture 102 that is coaxial with the cylindrical aperture 94 is located in the top side of the lower blow head arm member 66 and connects the first chamber 92 and the cylindrical aperture 96. A smaller aperture 104 that is coaxial with the cylindrical aperture 94 is located in the top side of the lower blow head arm member 66 and connects the first chamber 92 and the cylindrical aperture 98.

A second air passage includes a longitudinal passage 106 that extends longitudinally near the bottom side of the lower blow head arm member 66 and extends between the cylindrical aperture 94 and the cylindrical aperture 96. A third air passage begins in a longitudinal passage 108 that is located intermediate the longitudinal passage 106 and the top side of the lower blow head arm member 66. An aperture 110 is located intermediate the cylindrical aperture 94 and the cylindrical aperture 96 and extends between the longitudinal passage 106 and 108. An aperture 112 is located intermediate the cylindrical aperture 94 and the cylindrical aperture 96 and extends between the top side of the lower blow head arm member 66 and the longitudinal passage 108.

The cap 68 includes a downwardly extending hollow cylinder 114 that is in fluid communication with the aperture 112 in the lower blow head arm member 66. A bushing 116 is sealingly located in the aperture 110 and the aperture 112 and extends from the hollow cylinder 114 through the aperture 112 and into the aperture 110. The second extension socket 76 is screwed into the top of the cap 68 and is in fluid communication with the hollow cylinder 114 to supply finish cooling air to the longitudinal passage 106.

The second air passage also includes a longitudinal passage 118 that extends longitudinally near the bottom side of the lower blow head arm member 66 and extends between the cylindrical aperture 96 and the cylindrical aperture 98. The longitudinal passage 106 and the longitudinal passage 118 are connected by an annular recess 120 that is cut into the cylindrical aperture 96 and which will maintain the second air passage between the longitudinal passage 106 and the longitudinal passage 118 when a cylindrical sleeve (not shown in FIG. 4 and to be discussed below) is inserted into the cylindrical aperture 96.

The second air passage further includes annular recesses 122 and 124 that are respectively cut into the cylindrical apertures 94 and 96. An aperture 126 is cut between the back side of the lower blow head arm member 66 (the side opposite the side shown in FIG. 4) and the annular recess 122. Similarly, apertures 128 and 130 are respectively cut between the back side of the lower blow head arm member 66 and the annular recesses 120 and 124. The annular recess 122 will maintain the second air passage between the longitudinal passage 106 and the aperture 126 when a cylindrical sleeve (not shown in FIG. 4 and to be discussed below) is inserted into the cylindrical aperture 94, and the annular recess 124 will maintain the second air passage between the longitudinal passage 118 and the aperture 130 when a cylindrical sleeve (not shown in FIG. 4 and to be discussed below) is inserted into the cylindrical aperture 98.

The third air passage also includes a longitudinal passage 132 that is located intermediate the longitudinal passage 106 and the top side of the lower blow head arm member 66. The longitudinal passage 108 and the longitudinal passage 132 are connected by an annular recess 134 that is cut into the cylindrical aperture 96 and which will maintain the third air passage between the longitudinal passage 108 and the longitudinal passage 132 when a cylindrical sleeve (not shown in FIG. 4 and to be discussed below) is inserted into the cylindrical aperture 96.

The third air passage further includes annular recesses 136 and 138 that are respectively cut into the cylindrical apertures 94 and 98. An aperture 140 is cut into the annular recess 136 on the back side thereof which aperture 140 is in fluid communication with a passageway 142 extending from the top side of the boss 78 in the upper blow head arm member 64 and through the proximal end of the lower blow head arm member 66 to the aperture 140. The third extension socket 78 is screwed into the top of the boss 78 and is in fluid communication with the annular recesses 136, 134, and 138 to supply cylinder pressurizing air thereto.

Referring next to FIG. 5, the third air passage is shown in a view including the passageway 142 and its entrance through the aperture 140 into the annular recess 136. The portion of the second air passage including the annular recess 122 is shown in communication with a downwardly-extending vertical passageway 144 located in the lower blow head arm member 66 to the rear of the cylindrical aperture 94. Although not shown in the figures, there is another similar downwardly-extending vertical passageway located in the lower blow head arm member 66 behind the cylindrical aperture 96 (shown in FIG. 4) which is in communication with the annular recess 120 through the aperture 128, and still another similar downwardly-extending vertical passageway located in the lower blow head arm member 66 behind the cylindrical aperture 98 (shown in FIG. 4) which is in communication with the annular recess 124 through the aperture 130. A portion of the first air passage extending between the first chamber 92 and through the aperture 100 into the cylindrical aperture 94 is also shown in FIG. 5.

Referring next to FIG. 6, a cooling tube 150 one of which will mounted in each of the apertures 100, 102, and 104 in the upper surface of the lower blow head arm member 66 (shown in FIG. 4) is shown. The cooling tube 150 has a vertical passage 152 which extends entirely therethrough from the top of the cooling tube 150 to the bottom thereof. The cooling tube 150 has three segments extending from top to bottom, namely a top portion 154, and intermediate portion 156, and a bottom portion 158. The top portion 154 has a relatively large outer diameter, the intermediate potion 156 has a smaller outer diameter, and the bottom portion 158 has a still smaller outer diameter.

The top portion 154 of the cooling tube 150 has a diameter that is approximately the same as the diameter of the apertures 100, 102, and 104 in the top side of the lower blow head arm member 66 (shown in FIG. 4), which is where multiple ones of the cooling tubes 150 will be installed. The uppermost segment of the top portion 154 of the cooling tube 150 has a larger outer diameter flange 160 to prevent the cooling tube 150 from dropping through the apertures 100, 102, and 104 in the top side of the lower blow head arm member 66. Located below the flange 160 in the cooling tube 150 is an O-ring 162 located in a recessed annular groove, which will be used to sealingly install each of multiple ones of the cooling tubes 150 into the apertures 100, 102, and 104 in the top side of the lower blow head arm member 66.

Figure 7:
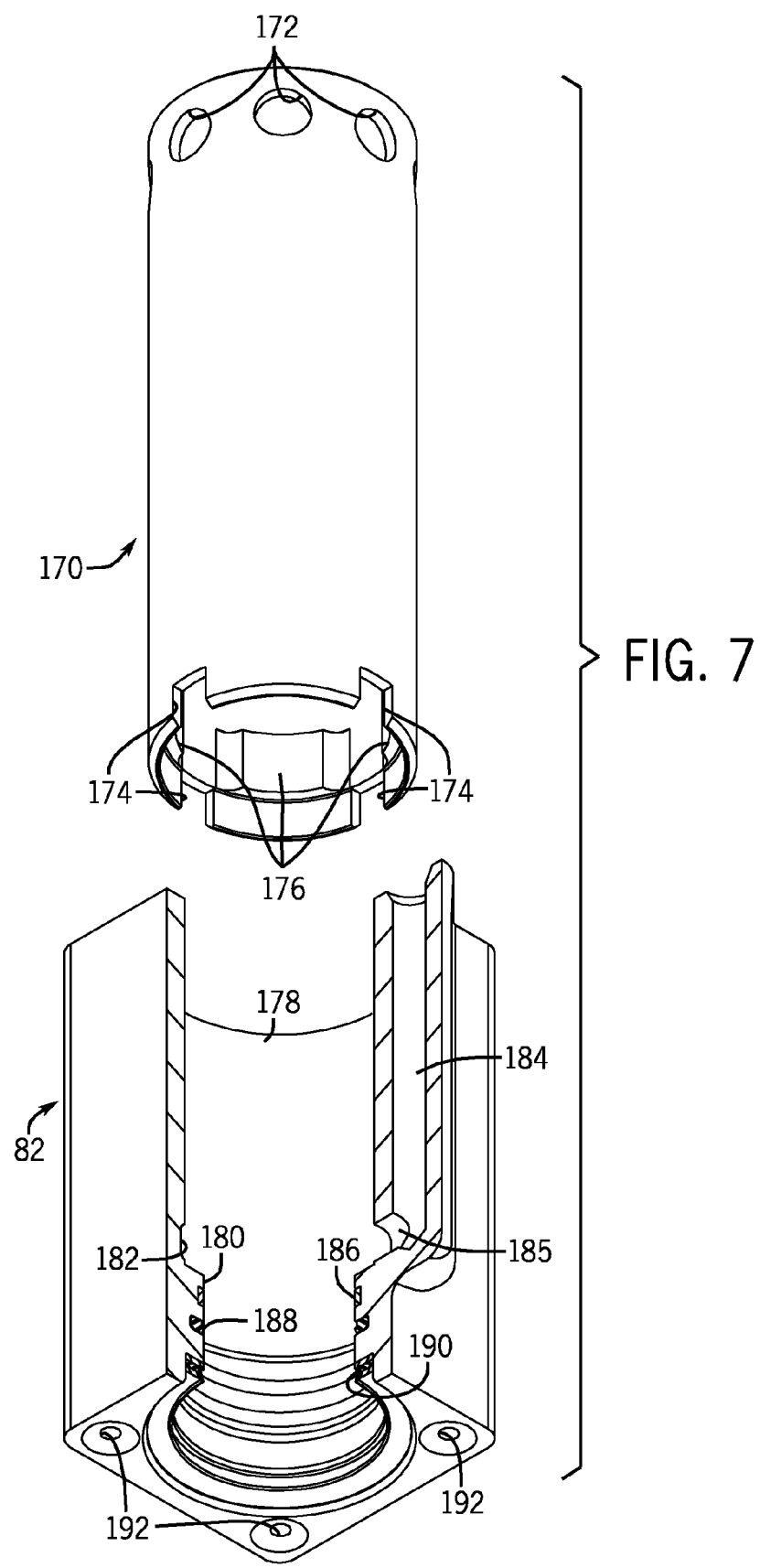
FIG. 7 is an exploded isometric view of a sleeve that will be located in a cylinder, with the cylinder being partially cut away for clarity.

Referring now to FIG. 7, a hollow, cylindrical sleeve 170 which fits into the top of the cylinder 82 is illustrated. The sleeve 170 has a plurality of apertures 172 equally spaced around the circumference thereof near its top end. The sleeve 170 has four notches 174 equally spaced around the circumference thereof at its bottom end which define four crenellated portions therebetween. Located immediately above each of these crenellated portions of the sleeve 170 and intermediate the notches 174 are four inwardly extending stops 176 that together define a smaller inner diameter than the inner diameter of the rest of the sleeve 170. When mounted, the top ends of three of the sleeves 170 will be respectively located in the cylindrical apertures 94, 96, and 98, with the apertures 172 allowing air in the third air passage to pass therethrough from the annular recesses 136, 134, and 138 respectively, to the interior of the sleeves 170.

Still referring to FIG. 7, it may be seen that the cylinder 82 has a cylindrical interior 178 extending from the top end thereof with a smaller cylindrical interior 180 being located at the bottom thereof. Located at the bottom of the cylindrical interior 178 just above the smaller cylindrical interior 180 is an annular recess 182 having a larger diameter than the diameter of the cylindrical interior 178. Extending down from the top of the cylinder 82 on one side thereof is a passageway 184 that at its lower end has an inwardly-extending aperture 185 that communicates with the annular recess 182. If the cylinder 82 is mounted on the blow head arm 60 below the cylindrical aperture 94 (best shown in FIG. 5), the passageway 184 will be in fluid communication with the downwardly-extending vertical passageway 144 (also shown in FIG. 5). Thus, air from the second air passage will be supplied through the downwardly-extending vertical passageway 144 and the passageway 184 to the annular recess 182.

It may be seen that the sleeve 170 will fit into the cylindrical interior 178 of the cylinder 82 down to the location of the smaller cylindrical interior 180. Located in the cylindrical interior 180 in the cylinder 82 are three spaced-apart annular grooves in which are respectively located, from top to bottom, a guide ring 186, a seal ring 188, and a scraper ring 190. Located in the cylinder 82 and extending from the bottom to the top thereof near the four corners thereof are four apertures 192 which are recessed at the bottom of the cylinder 82. These apertures 192 will communicate with threaded apertures (not shown herein) located on the bottom of the blow head arm 60 (shown in FIGS. 1 through 4.

Figure 8:
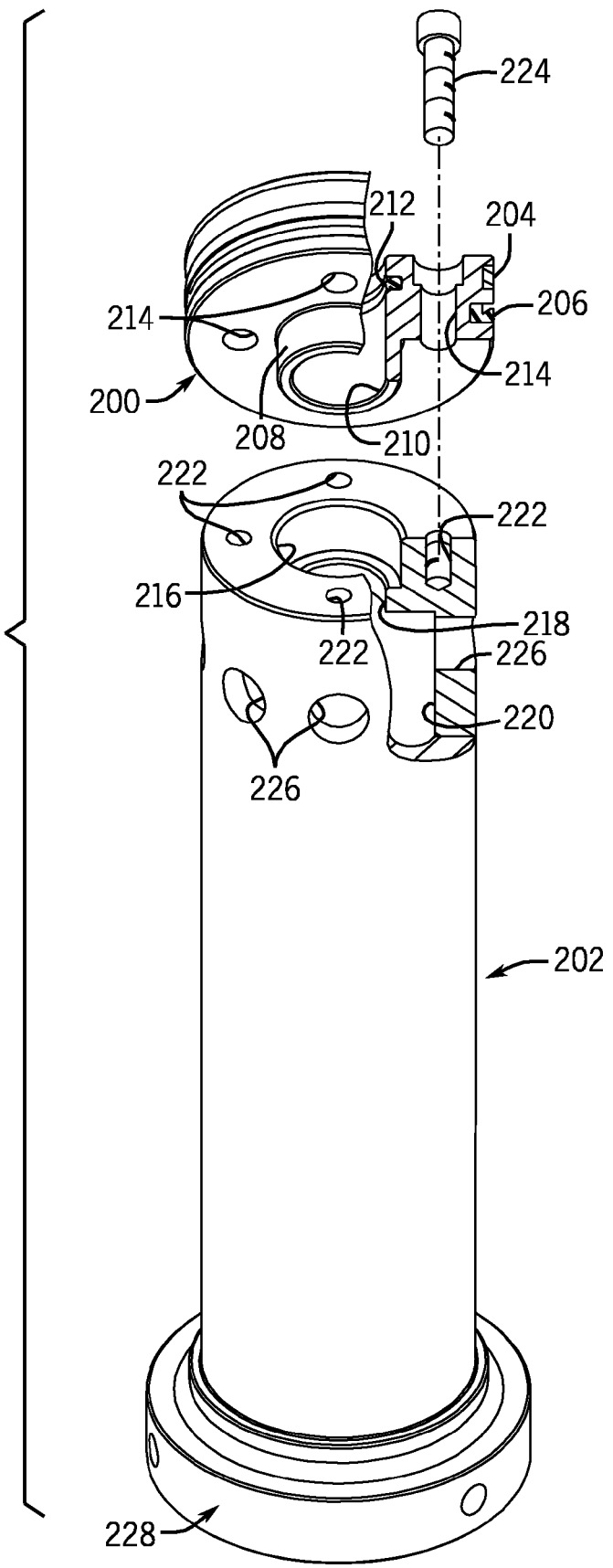
FIG. 8 is an exploded isometric partially cutaway view of a piston that will be mounted on a cylindrical slider also shown therein.

Referring next to FIG. 8, a cylindrical piston 200 which is mounted on top of a cylinder slider 202 is illustrated. The piston 200 has two spaced-apart annular grooves located in the outer diameter of the piston 200 in which are respectively located, from top to bottom, a guide ring 204 and a piston seal ring 206. Extending from the bottom of the piston 200 is a cylindrical extension 208. A cylindrical aperture 210 extends through the piston 200 and the cylindrical extension 208. A seal ring 212 is located in an annular recess located in the cylindrical aperture 210 near the top end thereof (the intermediate potion 156 of the cooling tube 150 shown in FIG. 6 will sealingly slide through the cylindrical aperture 210 and the seal ring 212). Four spaced-apart apertures 214 with larger countersunk top annular portions extend through the piston 200 from top to bottom thereof around the location of the cylindrical extension 208 on the bottom of the piston 200.

Still referring to FIG. 8, the slider 202 is hollow throughout its entire length, with a cylindrical interior segment 216 extending from the top end thereof that is sized to receive the cylindrical extension 208 when the piston 200 is located on the top end of the slider 202. Located immediately below the cylindrical interior segment 216 is a smaller diameter cylindrical segment 218, and below that is a larger diameter cylindrical segment 220 that extends to the bottom of the slider 202. Located in the top end of the slider 202 are four spaced-apart threaded apertures 222 that are aligned with the apertures 214 in the slider 202. Four socket head bolts 224 are respectively inserted through the four apertures 214 in the piston 200 in countersunk fashion and are then screwed into the respective four threaded apertures 222 in the slider 202.

Located in spaced apart fashion around the diameter of the slider 202 are a plurality of apertures 226 which are in communication with the larger diameter cylindrical segment 220 inside the slider 202 near the top end thereof. When the piston 200 is located inside the sleeve 170 within the cylinder 82 (shown in FIG. 7) with the slider 202 extending from the bottom of the cylinder 82, the apertures 226 will be supplied with air from the second air passage, providing that air to the larger diameter cylindrical segment 220 inside the slider 202. It will be appreciated by those skilled in the art that the bottom side of the piston 200 will be stopped from dropping out of the sleeve 170 by the stops 176 in the sleeve 170 (shown in FIG. 7). Located on the bottom of the slider 202 is an enlarged blow head mounting member 228 onto which the blow head 48 (shown in FIGS. 1 through 3) will be mounted.

Figure 9:
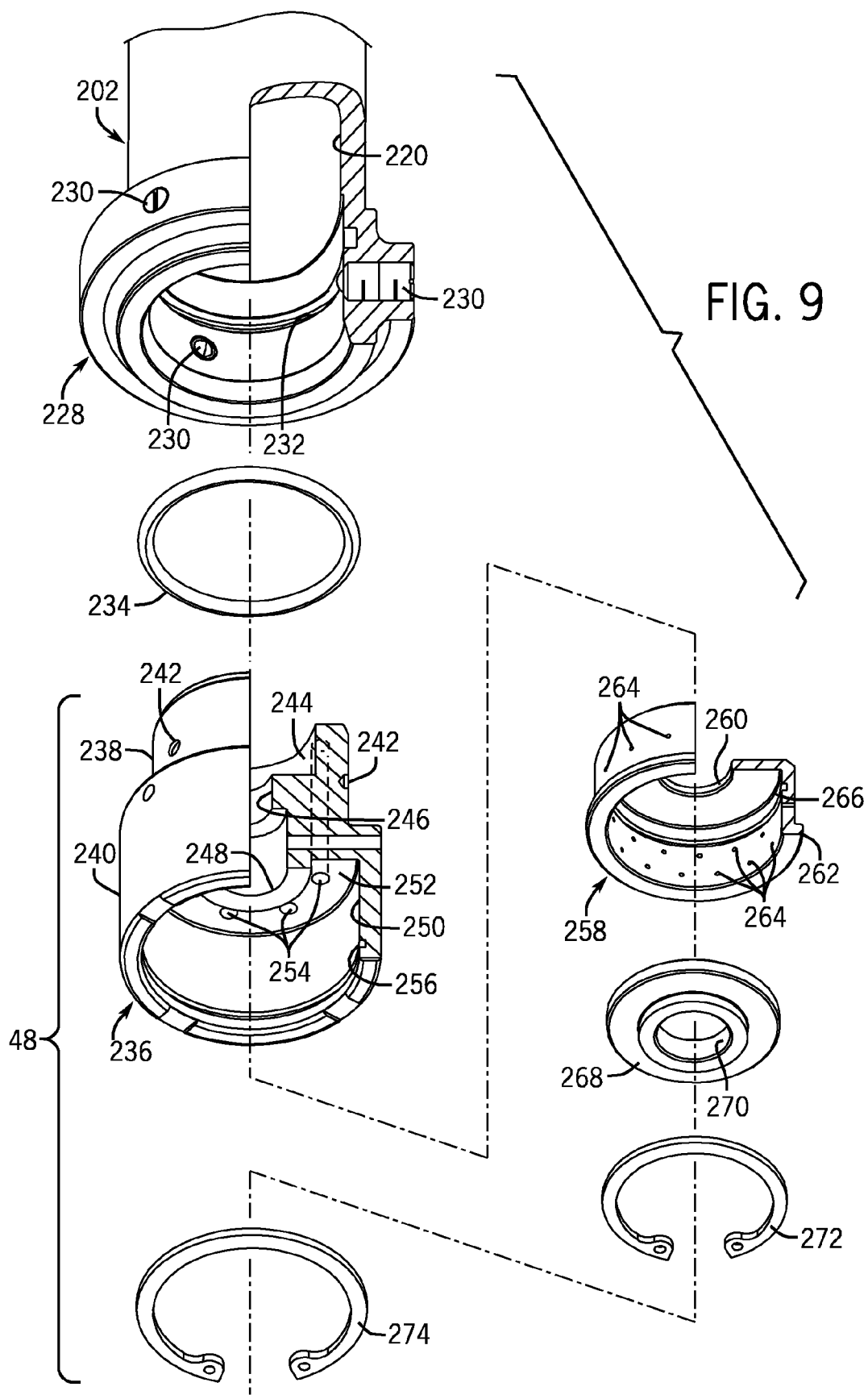
FIG. 9 is an exploded isometric partially cutaway view of the various components of a blow head showing it being mounted on the bottom end of the slider illustrated in FIG. 8.

Turning next to FIG. 9, the construction and installation of the blow head 48 onto the blow head mounting member 228 of the slider 202 is illustrated. Located in the blow head mounting member 228 are three ball plunger assemblies 230 that will be used to retain the blow head 48 on the blow head mounting member 228. Located just above the ball plunger assemblies 230 in the larger diameter cylindrical segment 220 is an annular groove 232 into which an O-ring 234 will be located.

A blow head housing 236 has a smaller diameter upper portion 238 located on a larger diameter lower portion 240. The smaller diameter upper portion 238 is sized to fit inside the larger diameter cylindrical segment 220 of the slider 202, and has three indentations 242 spaced around the outer periphery thereof to cooperate with the three ball plunger assemblies 230 in the blow head mounting member 228 to removably retain the blow head 48 on the slider 202.

The blow head housing 236 has four inner diameters located therein from top to bottom. A larger inner diameter portion 244 is located in the smaller diameter upper portion 238 at the top portion thereof, with a smaller inner diameter portion 246 located under the larger inner diameter portion 244. The bottom portion 158 of the cooling tube 150 (shown in FIG. 6) will extend through this smaller inner diameter portion 246. Located in the bottom portion of the smaller diameter upper portion 238 of the blow head housing 236 and in the upper portion of the larger diameter lower portion 240 of the blow head housing 236 is a medium inner diameter portion 248, with a much larger diameter inner diameter portion 250 located in the lower portion of the larger diameter lower portion 240 of the blow head housing 236.

An annular recess 252 extends the larger diameter inner diameter portion 250 upwardly above the bottom of the medium inner diameter portion 248. Located in that annular recess 252 and extending vertically through the blow head housing 236 are a plurality of spaced-apart apertures 254 that will be used to supply air from the second air passage to the blow head 48. Located in the larger diameter inner diameter portion 250 near the bottom of the larger diameter lower portion 240 of the blow head housing 236 is an annular groove 256.

A nozzle assembly 258 will fit into the larger diameter inner diameter portion 250 near the bottom of the larger diameter lower portion 240 of the blow head housing 236. The nozzle assembly 258 is a hollow cylinder having a closed top side with an aperture 260 extending therethrough through which the bottom portion 158 of the cooling tube 150 (shown in FIG. 6) will extend. Located on the bottom side of the nozzle assembly 258 is an outwardly-extending flange 262. Located at spaced-apart positions throughout the cylindrical portion of the nozzle assembly 258 are a plurality of cooling apertures 264. The outwardly-extending flange 262 will be in close contact with the larger diameter inner diameter portion 250 of the blow head housing 236 near the bottom of the larger diameter lower portion 240 thereof when the nozzle assembly 258 is installed into the blow head housing 236.

Located inside the cylindrical portion of the nozzle assembly 258 nearer the top thereof than the bottom thereof is an annular groove 266. A guide ring 268 having an inner aperture 270 through which the bottom portion 158 of the cooling tube 150 (shown in FIG. 6) will slide is inserted into the bottom of the nozzle assembly 258 and is retained in place by a retaining ring 272 which fits into the annular groove 266 in the nozzle assembly 258. The nozzle assembly 258 is then inserted into the bottom of the blow head housing 236 and is retained in place by a retaining ring 274 which fits into the annular groove 256 in the blow head housing 236.

Figure 10:
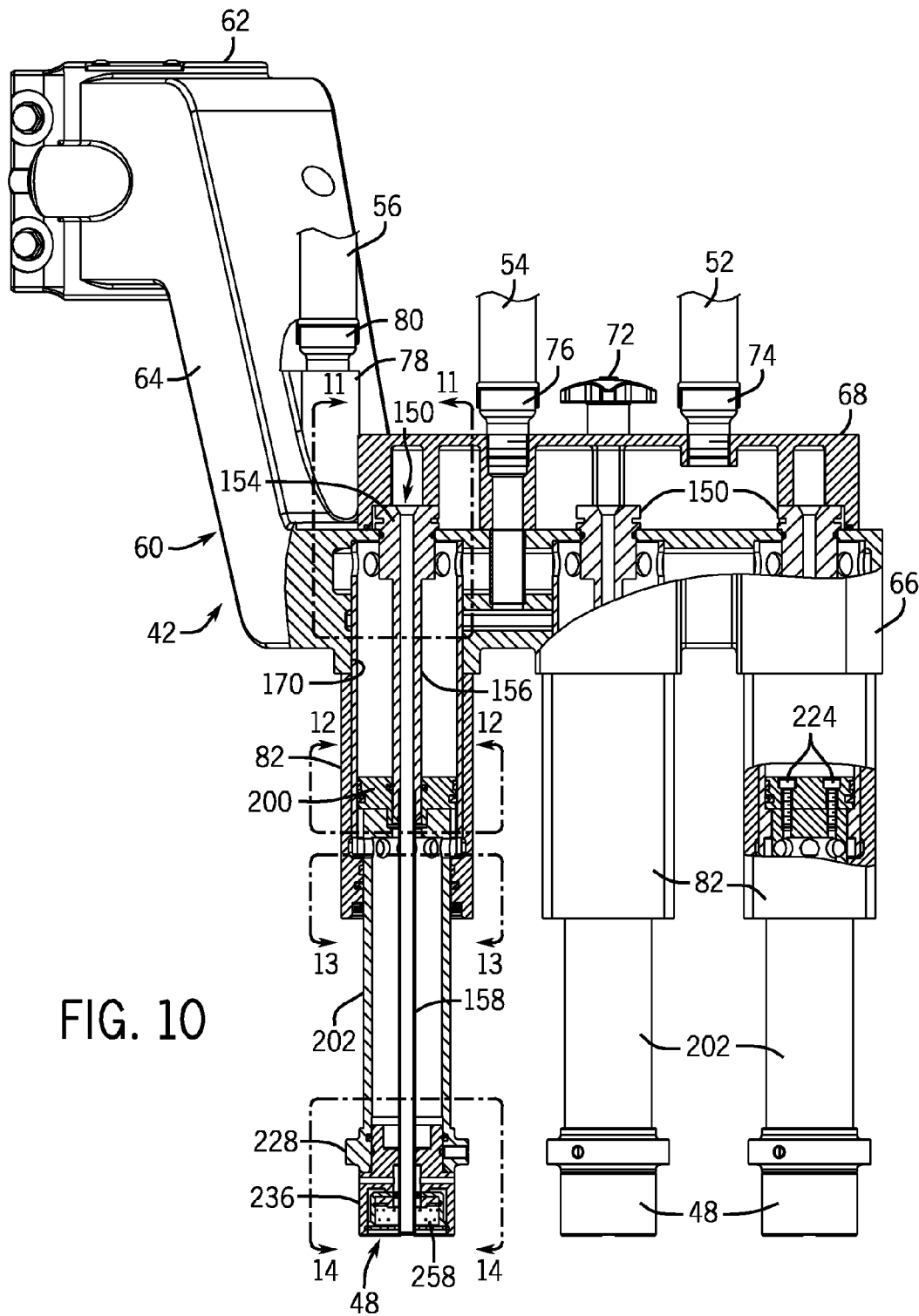
FIG. 10 is a partially cutaway side plan view of the blow head arm illustrated in FIGS. 2 through 5 with three sets of the cooling tube illustrated in FIG. 6, the sleeve and cylinder illustrated in FIG. 7, the piston and slider illustrated in FIG. 8, and the blow head illustrated in FIG. 9 installed in the blow head arm.

Referring now to FIG. 10 in particular, and to FIGS. 11 through 15 as necessary to show details, the assembly of the long stroke blow head mechanism of the present invention is illustrated. It will, of course, be realized by those skilled in the art that the blow head arm assembly 42 has three each of the cooling tubes 150, the cylinders 82, the sleeves 170, the pistons 200, the sliders 202, and the blow heads 48. The assembly of each set of these components is essentially identical, differing only in which of the three positions on the lower blow head arm member 66 of the blow head arm 60 the components are installed.

Figure 11:
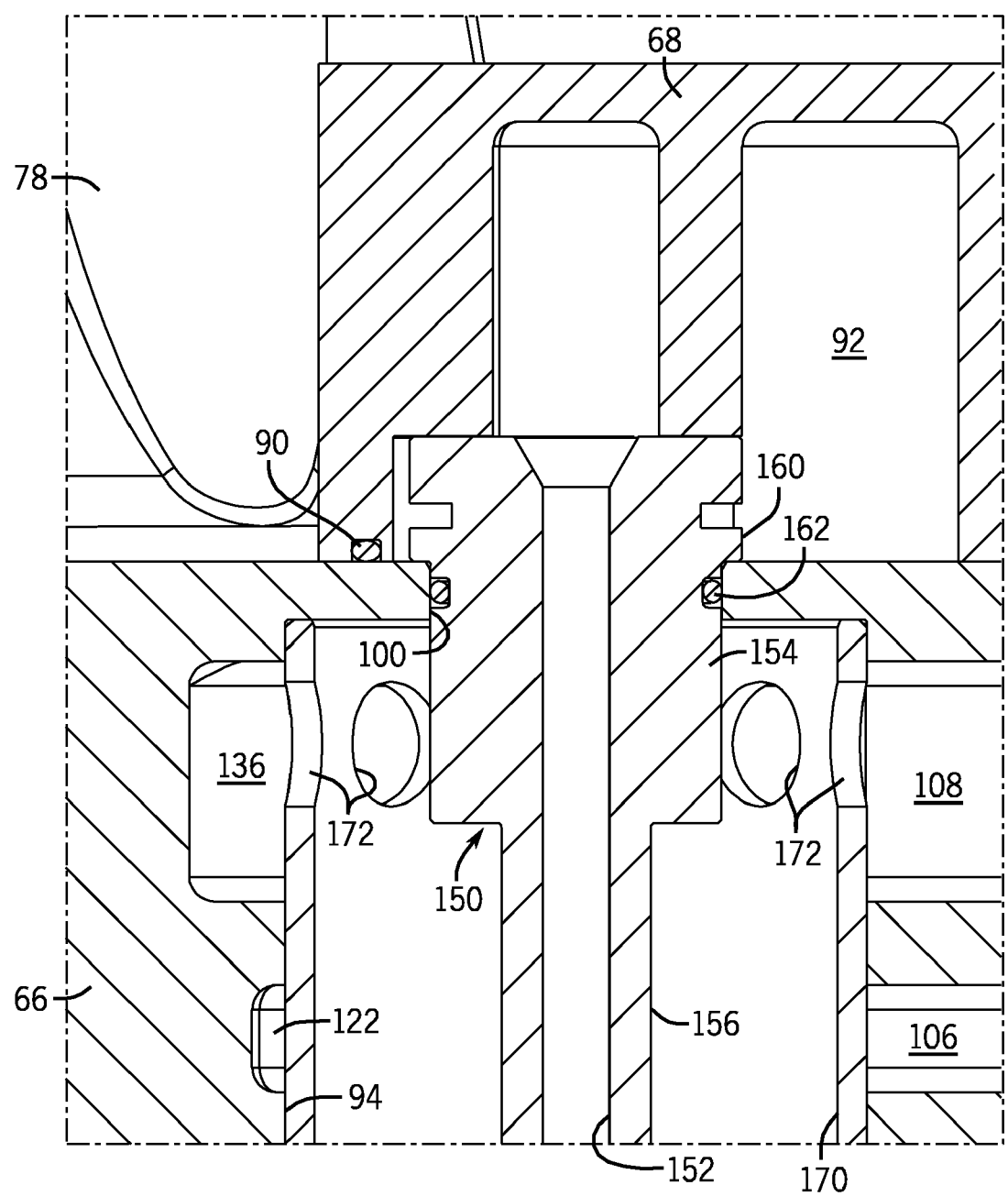
FIG. 11 is a detail view taken from FIG. 10 showing the sealing configuration of the top or proximal end of the cooling tube in the blow head arm.

The installation of the cooling tube 150 into the lower blow head arm member 66 of the blow head arm 60 is shown in FIGS. 10 and 11, and with reference to FIGS. 4 (to show the details of the lower blow head arm member 66) and 6 (to show the details of the cooling tube 150) as well. The cooling tube 150 is inserted through the aperture 100 in the lower blow head arm member 66 from the top side thereof until the top portion 154 of the cooling tube 150 fits into the aperture 100. When the O-ring 162 on the top portion 154 of the cooling tube 150 fits into the aperture 100 of the lower blow head arm member 66, the flange 160 on the top of the cooling tube 150 will fit against the top side of the lower blow head arm member 66 adjacent the aperture 100.

Figure 15:
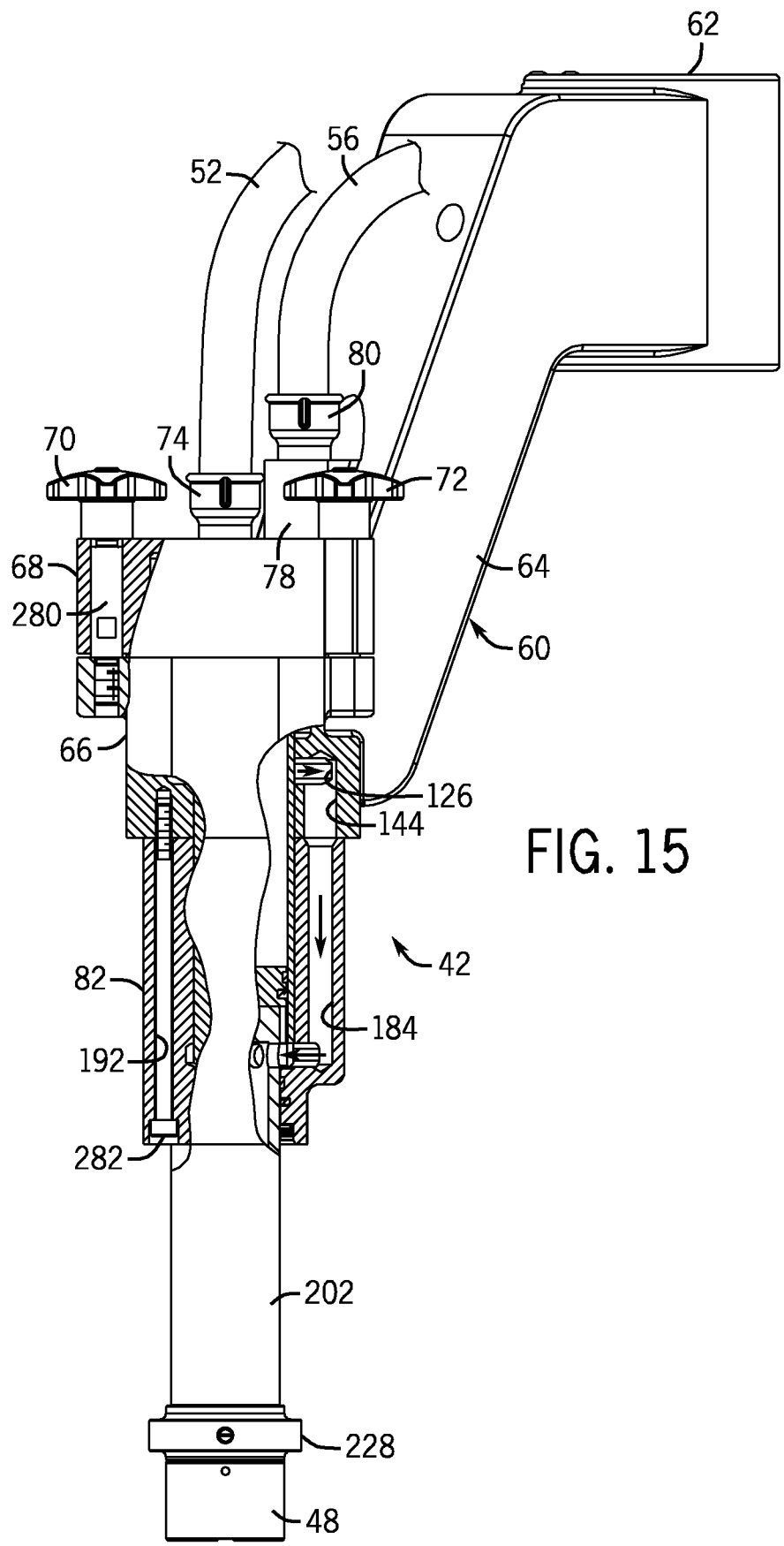
FIG. 15 is a partially cutaway end plan view of the assembled blow head arm from the end of the blow head arm opposite its mounting point, showing the air passage at the rear of the blow head arm for the blow head location furthest from the mounting point of the blow head arm which provides cooling air to the blow head for cooling the finish of a glass container, and also showing the full extent of a grip used to retain a cap on the blow head arm, and further showing one of a plurality of bolts used to retain the cylinder and sleeve on the blow head arm.

The cooling tube 150 is retained in this position by the placement of the cap 68 onto the top side of the lower blow head arm member 66, in which position it is retained by screwing the grips 70 and (best shown in FIG. 15) onto two securing members, one of which is shown in FIG. 15 and is designated by the reference numeral 280. The securing member 280 and the other securing member are each studs that are threaded at both ends, with their bottom ends being screwed into the top side of the lower blow head arm member 66. It may be seen that the grip 70 is screwed onto the securing member 280, while the grip 72 is screwed onto the other securing member (not shown).

The installation of the sleeve 170 into the cylinders 82 is shown in FIG. 10, and with reference to FIG. 7 as well. The sleeve 170 is slid into the cylindrical interior 178 of the cylinder 82 from the top end thereof until the bottom of the sleeve 170 passes the annular recess 182 in the cylinders 82 and reaches the smaller cylindrical interior 180 located at the bottom of the cylinder 82. In this position, the notches 174 in the bottom end of the sleeve 170 are located in the annular recess 182 in the cylinders 82, which annular recess 182 is in communication with the aperture 185 leading from the passageway 184 at the back side of the cylinder 82.

Figure 12:
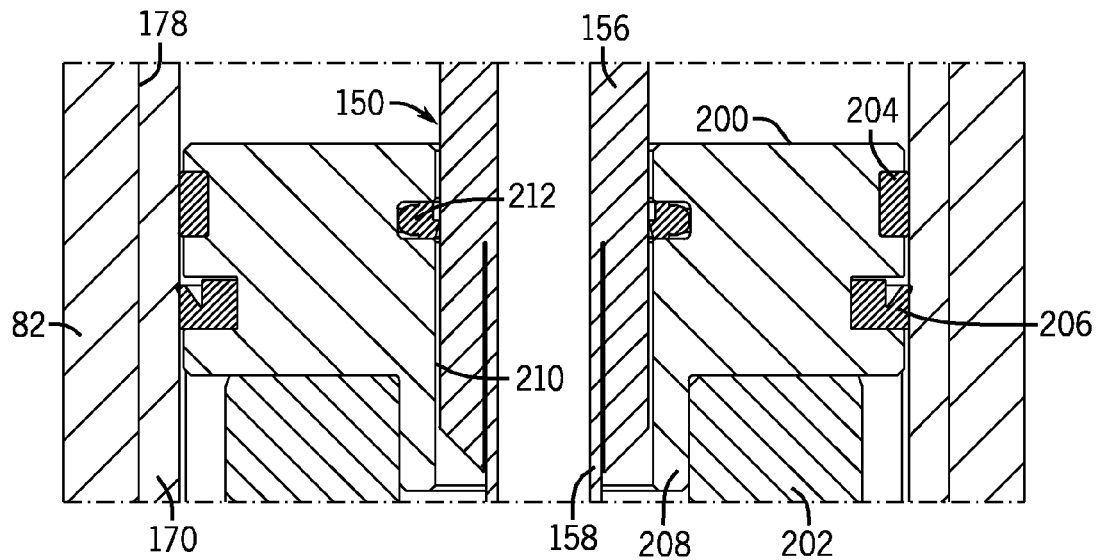
FIG. 12 is a detail view taken from FIG. 10 showing the sealing configuration of the piston on the cooling tube and in the cylinder.
Figure 13:
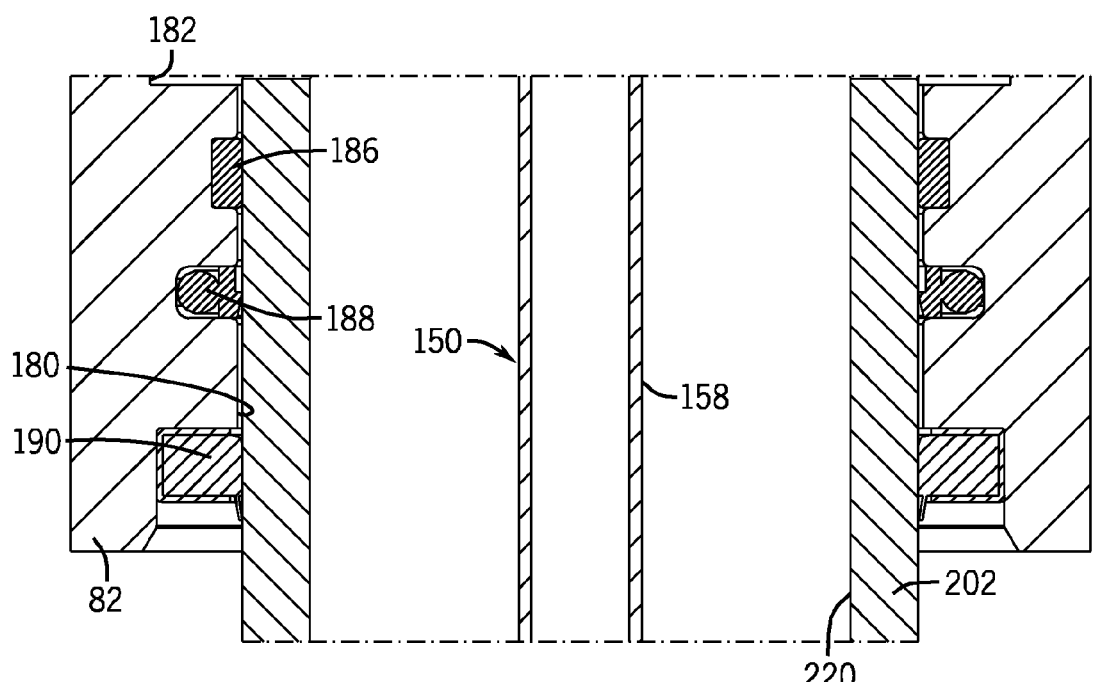
FIG. 13 is a detail view taken from FIG. 10 showing the sealing configuration of the slider in the bottom or distal end of the cylinder.
Figure 14:
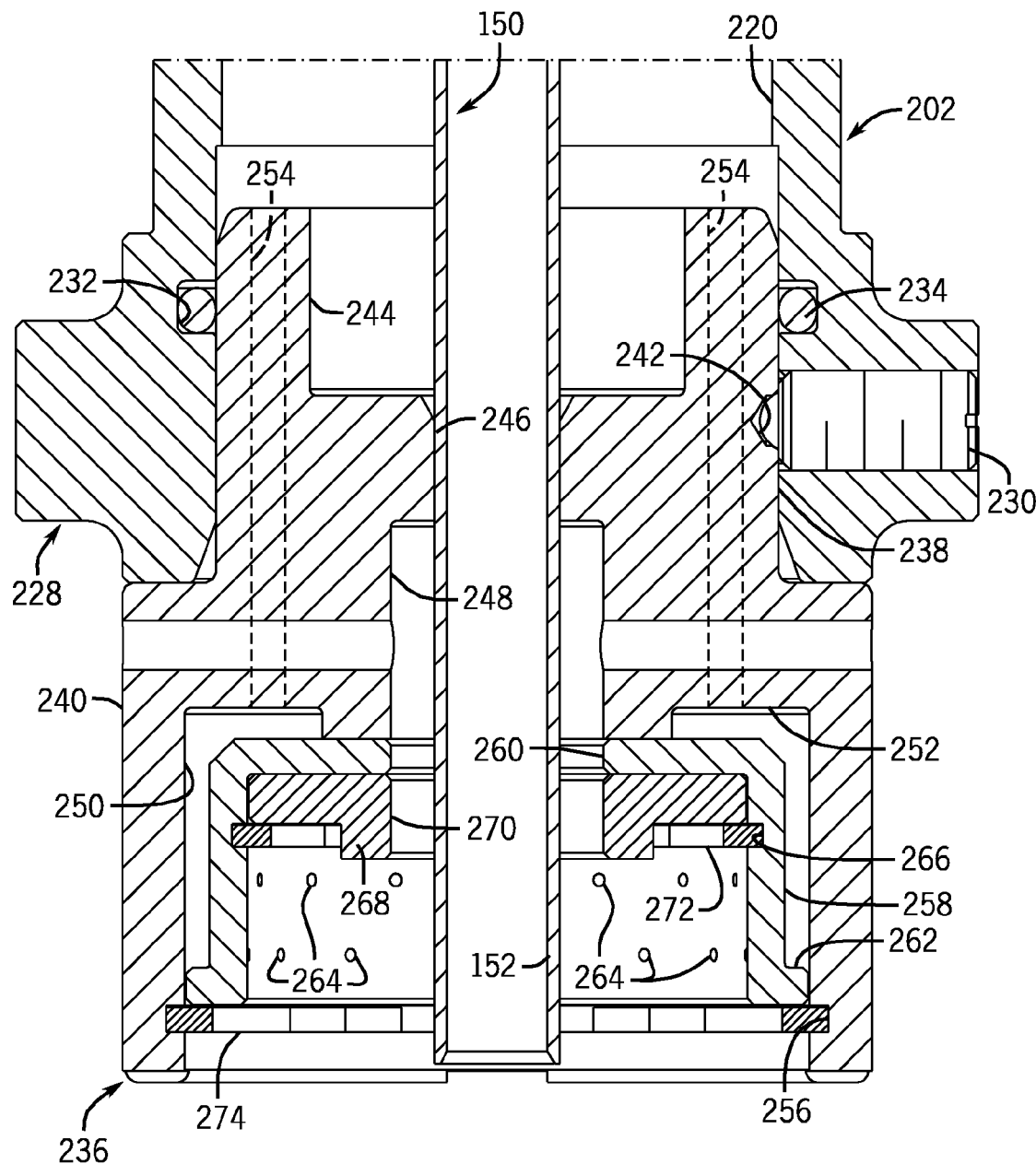
FIG. 14 is a detail view taken from FIG. 10 showing the installation of the blow head on the bottom or distal end of the slider and on the bottom or distal end of the cooling tube.

Next, the installation of the slider 202 and the piston 200 into the cylinders 82 is shown in FIGS. 10, 12, and 13, and with reference to FIGS. 7 and 8 as well. The top end of the slider 202 is inserted into the bottom end of the cylinder 82 through the cylindrical interior 180 in the cylinder 82, as best shown in FIG. 13. The slider 202 passes through the scraper ring 190, the seal ring 188, and the guide ring 186 as it is inserted into the cylinder 82 from the bottom end thereof.

The piston 200 is inserted into the top end of the sleeve 170 in the cylinder 82, as best shown in FIG. 12. The piston seal ring 206 and the guide ring 204 of the piston 200 fit into the interior of the sleeve 170, and the piston 200 is lowered in the sleeve 170 in the cylinder 82 onto the top end of the slider 202. The piston 200 is then attached to the top end of the slider 202 as described above with regard to the written description accompanying FIG. 8. The piston 200 will limit the downward movement of the slider 202 when the bottom side of the piston 200 comes into contact with the stops 176 in the interior of the sleeve 170 at the bottom end thereof.

The installation of the cylinder 82, the sleeve 170, and the piston 200 and the slider 202 onto the bottom of the lower blow head arm member 66 at the leftmost position shown in FIG. 10 is shown in FIGS. 10 and 15, and with reference to FIGS. 4, 7, and 8 as well. The bottom portion 158 of the cooling tube 150 is inserted through the cylindrical aperture 210 in the piston 200, and then the intermediate potion 156 of the cooling tube 150 is inserted through the cylindrical aperture 210 in the piston 200, passing through the seal ring 212 in the piston 200. The top end of the sleeve 170 is inserted fully into the cylindrical aperture 94 in the bottom of the lower blow head arm member 66, with the apertures 172 near the top of the sleeve 170 being located with the annular recess 136 in the lower blow head arm member 66 surrounding them. In this position, the distal end of the bottom portion 158 of the cooling tube 150 will be inserted through the smaller inner diameter portion 246 in the blow head housing 236, the aperture 260 in the nozzle assembly 258, and the aperture 270 in the guide ring 268 (each of which components of the blow heads 48 is shown in FIG. 9).

The top of the cylinder 82 is in contact with the bottom of the lower blow head arm member 66. Four long socket head bolts 282 (one of which is shown in FIG. 15) are inserted into the four apertures 192 in the cylinder 82 and are screwed into threaded apertures located in the bottom side of the lower blow head arm member 66. The blow head 48 may then be installed onto the blow head mounting member 228 of the slider 202, with the distal end of the bottom portion 158 of the cooling tube 150 extending through the blow head 48 (shown in FIG. 9) approximately to the bottom thereof (with the slider 202 in its fully downward position). In this manner, all three of the sets of the cooling tubes 150, the cylinders 82, the sleeves 170, the pistons 200, the sliders 202, and the blow heads 48 are assembled onto the lower blow head arm member 66.

The complete extent of each of the three air passages located in the blow head arm assembly 42 may now be briefly described with respect to the set of the cooling tube 150, the cylinder 82, the sleeve 170, the piston 200, the slider 202, and the blow head 48 located at the left in FIG. 10. The first air passage is supplied with air from the first pressurized air source 52 through the first extension socket 74 and into the first chamber 92 in the lower blow head arm member 66 (shown in FIG. 4). From the first chamber 92, the first air passage continues through the vertical passage 152 in the cooling tube 150, and terminates at the bottom of the bottom portion 158 of the cooling tube 150 (all best shown in FIG. 6), where air from the first air passage is used for final blow and cooling air.

The second air passage is supplied with air from the second pressurized air source 54 through the second extension socket 76, the hollow cylinder 114, and the bushing 116 into the longitudinal passage 106 in the lower blow head arm member 66 (shown in FIG. 4). From the longitudinal passage 106, the second air passage continues into the annular recess 122, which is located around the outside of the sleeve 170, and then through the aperture 126 into the downwardly-extending vertical passageway 144 in the back of the lower blow head arm member 66 (shown in FIG. 5). From the bottom of the downwardly-extending vertical passageway 144 in the lower blow head arm member 66, the second air passage continues into the passageway 184 in the cylinder 82 (shown in FIG. 7). From the passageway 184 in the cylinder 82, the second air passage continues into the annular recess 182 and into the space above the annular recess 182 between the interior of the sleeve 170 and the exterior of the slider 202 and below the piston 200. The second air passage continues through the apertures 226 in the slider 202 and down through the slider 202 to the blow head 48. Air in the second air passage then flows through the apertures 254 in the blow head housing 236 of the blow head 48, and subsequently through the cooling apertures 264 in the nozzle assembly 258, where it may be used to cool the finish of a glass container.

The third air passage is supplied with air from the third pressurized air source 56 through the third extension socket 80, the passageway 142, and the aperture 140 into the annular recess 136 in the lower blow head arm member 66 (shown in FIG. 5). From the annular recess 136, the third air passage continues through the apertures 172 in the top end of the sleeve 170 and into the interior of the sleeve 170 above the piston 200 as shown in FIG. 11. Air from the third air passages is used to pressurize the piston 200 in the sleeve 170, and pressurized air from the third pressurized air source 56 will accordingly be used to maintain a constant pressure on the top side of the piston 200 and the slider 202.

Figure 16:
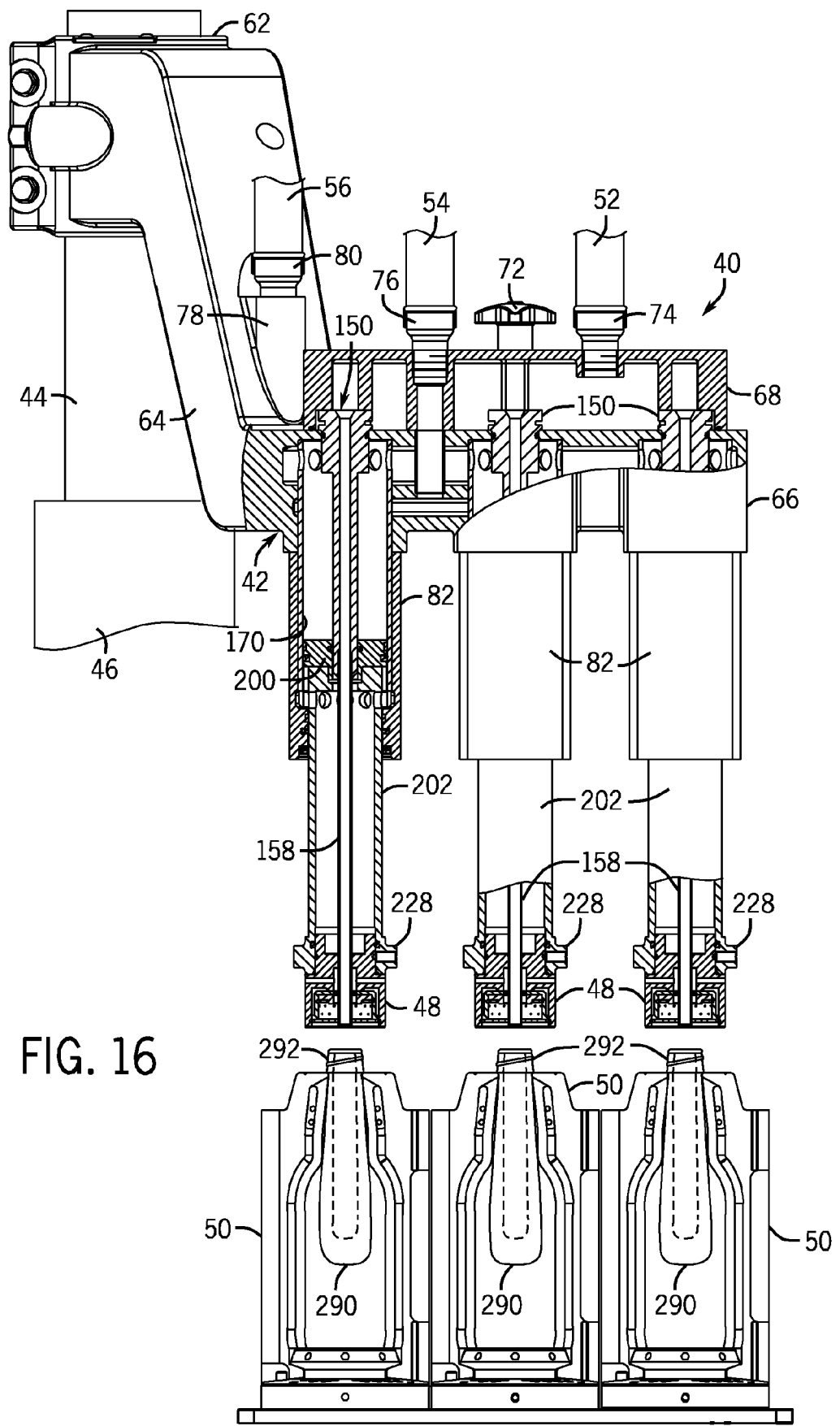
FIG. 16 is the first of seven partially cutaway side plan view figures that illustrate the operation of the long stroke blow head mechanism of the present invention to blow and cool a parison in a blow mold, with FIG. 16 showing the blow head arm positioned in a first position with the blow heads being located above the respective finishes of parisons in their respective blow molds.

The operation of the long stroke blow head mechanism of the present invention is illustrated in FIGS. 16 through 22. Referring first to FIG. 16, three unblown parisons 290 are respectively shown in the three blow molds 50, with each of the parisons 290 having a finish 292 supported at the top of the respective blow mold 50. The blow head arm assembly 42 is supported by the blow head lift mechanism 46 with the sliders 202 in their fully downward positions (with the pistons 200 located on the stops 176 of the sleeves 170 (best shown in FIG. 7).

The air chambers in each of the sleeves 170 above the pistons 200 are pressurized, and remain pressurized at a constant pressure throughout the operation of the blow head arm assembly 42. The pistons 200 are located in contact with the stops 176 in the interior of the sleeves 170 at the bottom ends thereof (shown in FIG. 7), and the blow heads 48, located at the bottoms of the sliders 202, are located above the finishes 292 of the parisons 290. The bottoms or distal ends of the bottom portions 158 of the cooling tubes 150 are located at a position near the bottom of the blow heads 48. Both the blow heads and the bottoms or distal ends of the bottom portions 158 of the cooling tubes 150 are located above and spaced away from the respective finishes 292 of the unblown parisons 290 in the respective blow molds 50. This shall be referred to as the first position of the blow head arm assembly 42 on the blow head lift mechanism 46.

Figure 17:
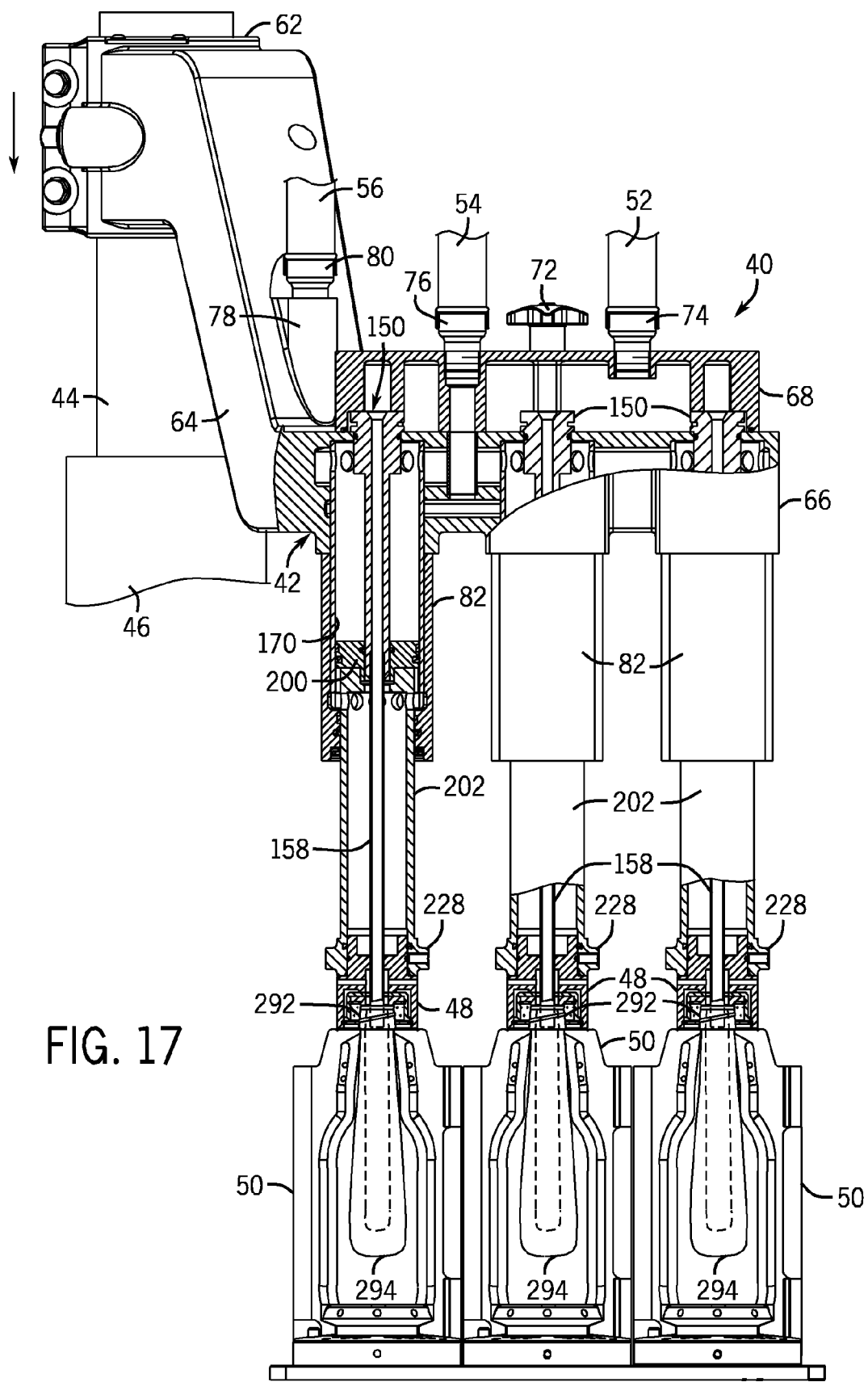
FIG. 17 is a figure similar to the one illustrated in FIG. 16, with the blow head arm lowered to a second position in which the blow heads are located on the respective blow molds and are engaged with the respective finishes of parisons in their respective blow molds and the distal ends of the cooling tubes are located just inside the bore inside the finish of the respective parisons prior to the parisons being blown.

Referring next to FIG. 17, the blow head arm assembly 42 has been lowered by the blow head lift mechanism 46 into a second position in which the blow heads 48 are in place upon the tops of the blow molds 50 and are engaging the finishes 292, and final blow air has begun to be supplied from the first pressurized air source 52 to begin to blow the parisons which appear in FIG. 17 as partially blown parisons 294. The pistons 200 remain located in contact with the stops 176 in the interiors of the sleeves 170 at the bottom end thereof (shown in FIG. 7). The bottoms or distal ends of the bottom portions 158 of the cooling tubes 150 are still located at a position near the bottom of the blow heads 48 (and thus near the bottoms of the finishes of the partially blown parisons 294). This is the second position of the blow head arm assembly 42 on the blow head lift mechanism 46.

Figure 18:
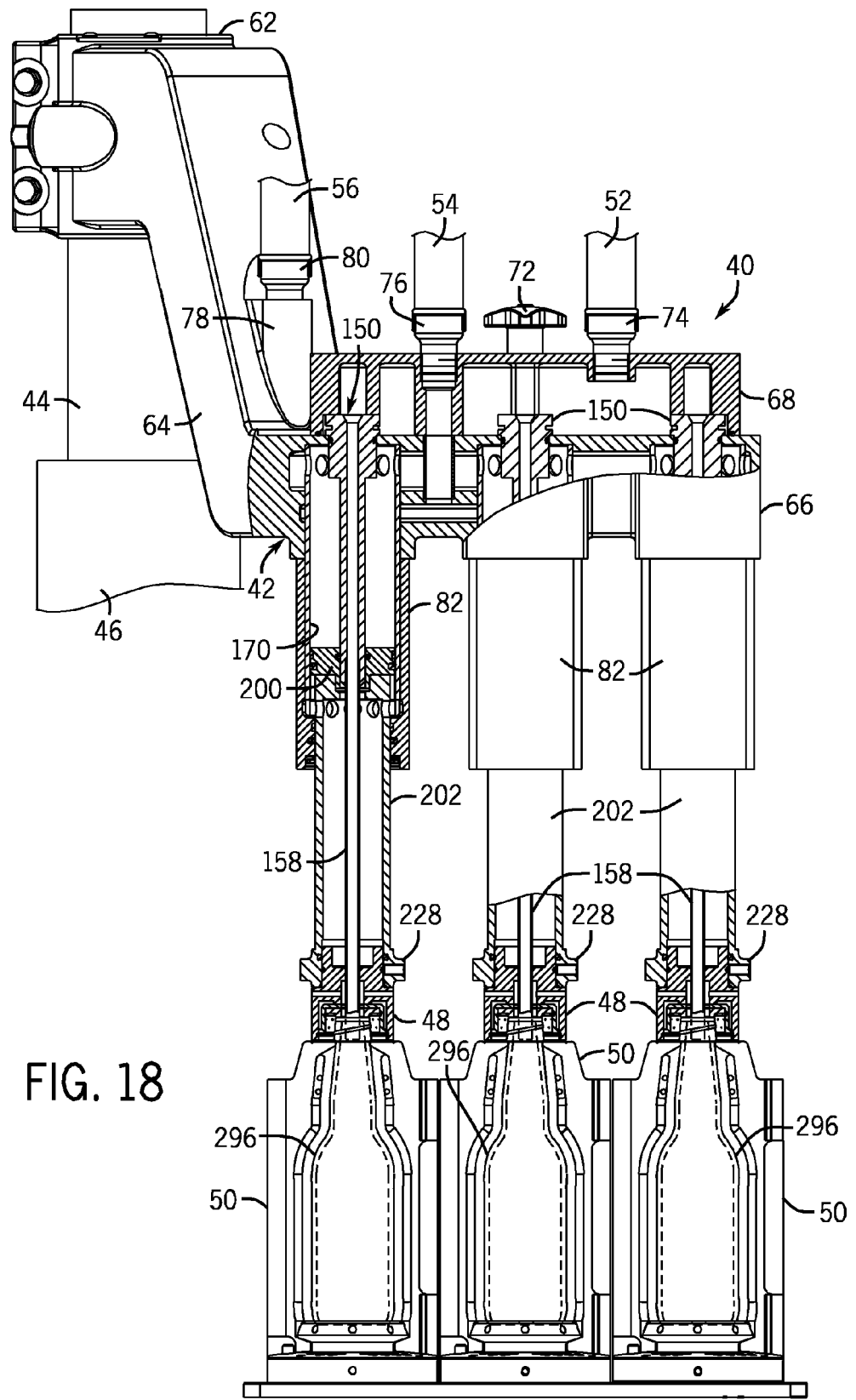
FIG. 18 is a figure similar to the one illustrated in FIG. 17, with the blow head arm in its second position with the parisons having been blown.

Referring now to FIG. 18, the blow head arm assembly 42 remains in its second position, but the final blow air from the first pressurized air source 52 has fully blown the parisons which thus appear in FIG. 18 as fully blown parisons 296. With the blow head arm assembly 42 in this second position, finish cooling air would begin to be supplied from the second pressurized air source 54 to cool the finishes 292 of the blown parison 296 (and cooling air would also begin to be supplied to the blow molds 50 to cool the outsides of the blown parisons 296).

Figure 19:
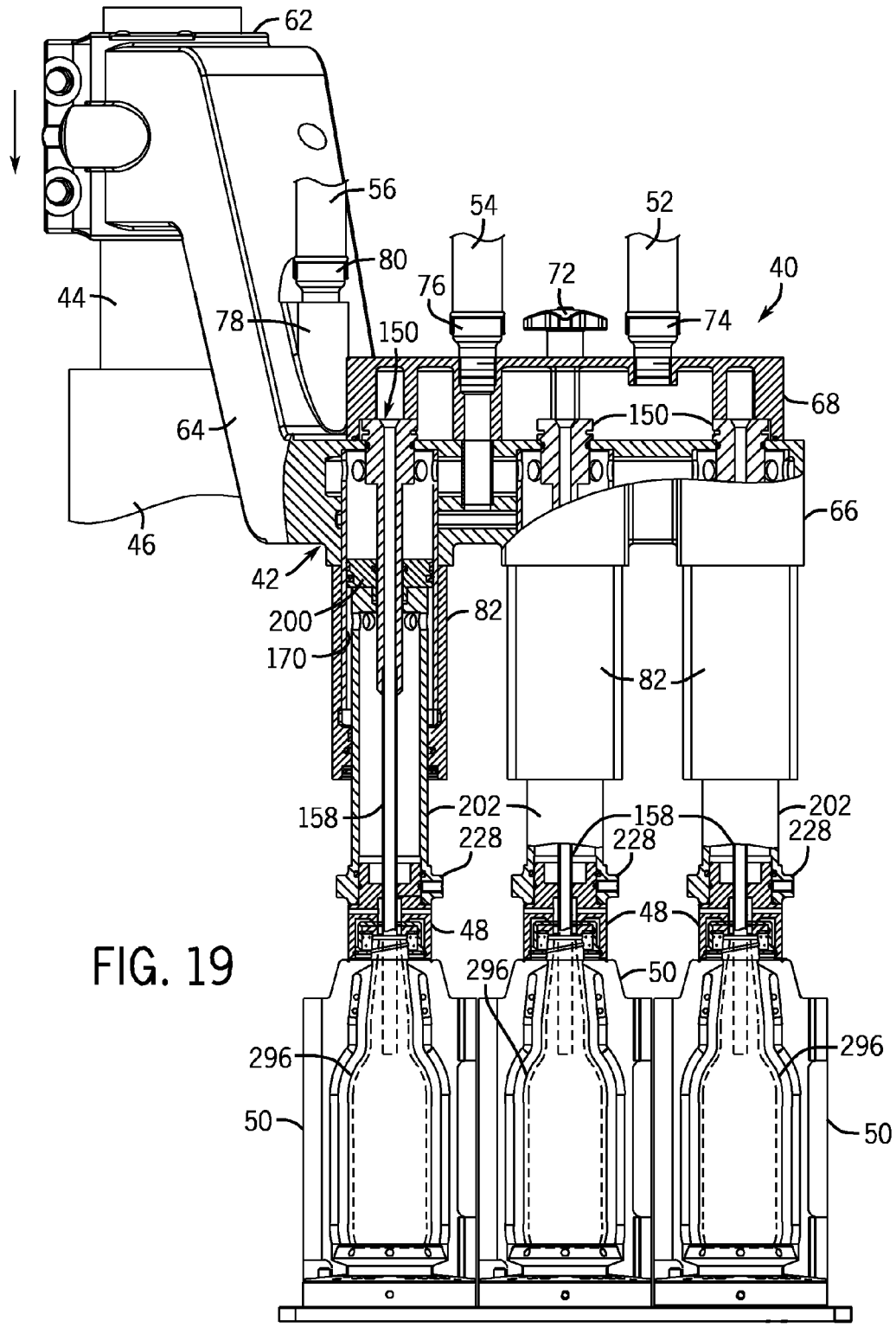
FIG. 19 is a figure similar to the one illustrated in FIG. 18, with the blow head arm further lowered to a third position in which the blow heads remain on the respective blow molds to keep the respective blow heads engaged with the finishes of the blow parisons and the distal ends of the cooling tubes are lowered into the respective blown parisons to the bottoms of the necks of the respective blown parisons.

Referring next to FIG. 19, the blow head arm assembly 42 has been lowered by the blow head lift mechanism 46 below its second position to a third position in which the bottoms or distal ends of the bottom portions 158 of the cooling tubes 150 are located below the bottom of the blow heads 48. It may be seen that the bottoms or distal ends of the bottom portions 158 of the cooling tubes 150 are located just above the shoulders of the blown parisons 296. However, the blow heads 48 remain in place upon the blow molds 50 and in engagement with the finishes 292, with the pistons 200 having moved upwardly in the sleeves 170 away from the stops 176 in the interior of the sleeves 170 at the bottom ends thereof (shown in FIG. 7). The pressure in the air chambers in each of the sleeves 170 above the pistons 200 remains constant, exerting the same downward pressure maintaining the blow heads 48 in place upon the blow molds 50 and in engagement with the finishes 292 of the blown parisons 296.

Figure 20:
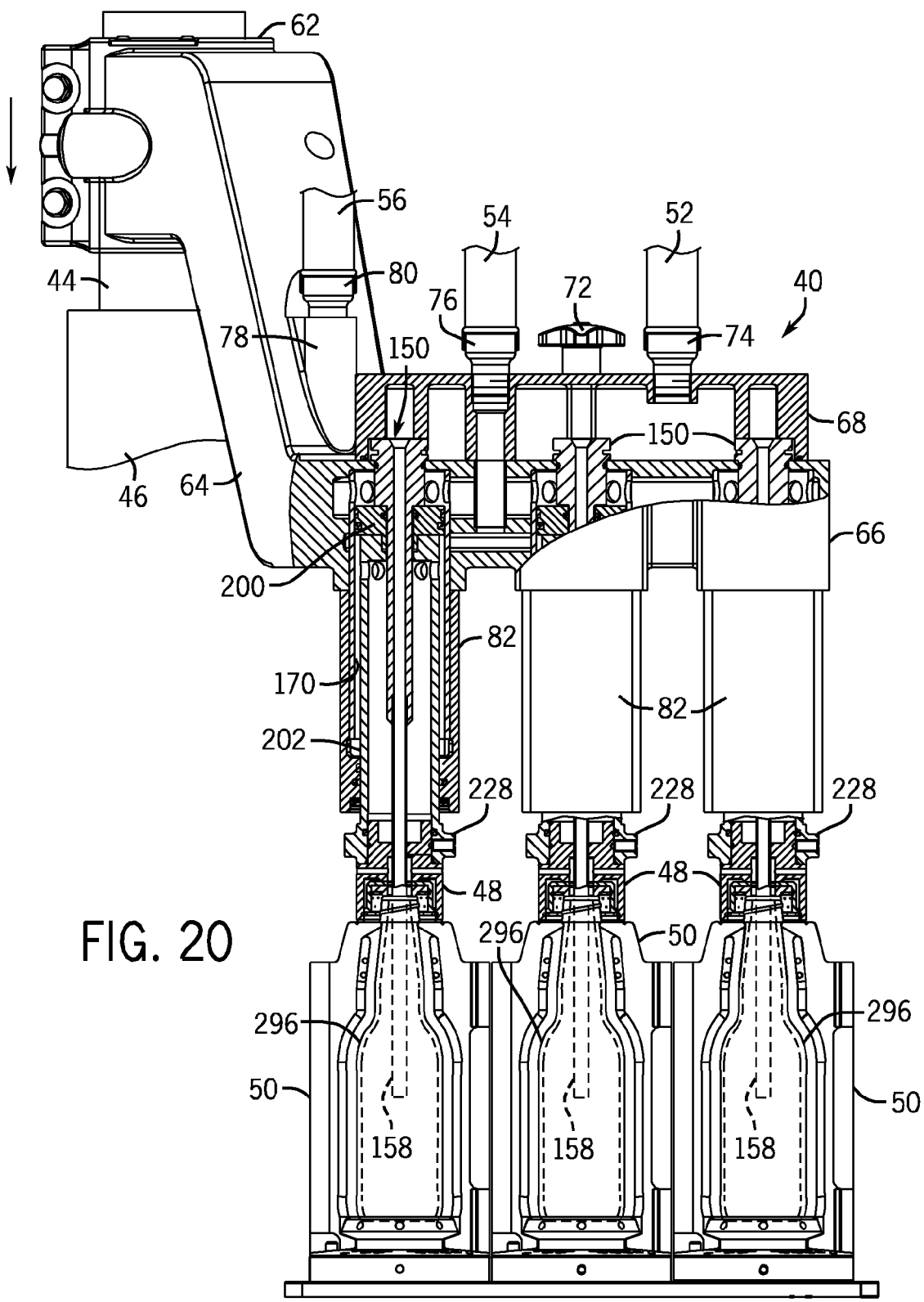
FIG. 20 is a figure similar to the one illustrated in FIG. 19, with the blow head arm still further lowered to a fourth position in which the blow heads remain on the respective blow molds to keep the respective blow heads engaged with the respective finishes of the blow parisons and the distal ends of the cooling tubes are lowered into the respective blown parisons below the bottoms of the shoulders of the respective blown parisons.

Referring now to FIG. 20, the blow head arm assembly 42 has been lowered by the blow head lift mechanism 46 still further below its third position to a fourth position in which the bottoms or distal ends of the bottom portions 158 of the cooling tubes 150 are located still lower than the position in which they were shown in FIG. 19. It may be seen that the bottoms or distal ends of the bottom portions 158 of the cooling tubes 150 are located below the shoulders of the blown parisons 296, in the top portions of the bodies of the blown parison 296 (typically approximately 40 to 60 percent of the way from the top of the blown parison 296 to the bottom of the blown parison 296). The blow heads 48 still remain in place upon the blow molds 50 and in engagement with the finishes 292, with the pistons 200 now having moved upwardly in the sleeves 170 just below the apertures 172 near the tops thereof (shown in FIG. 7). The pressure in the air chambers in each of the sleeves 170 above the pistons 200 still remains constant, exerting the same downward pressure of the blow heads 48 on the blow molds 50 to keep the blow heads 48 in engagement with the finishes 292 of the blown parisons 296.

Figure 21:
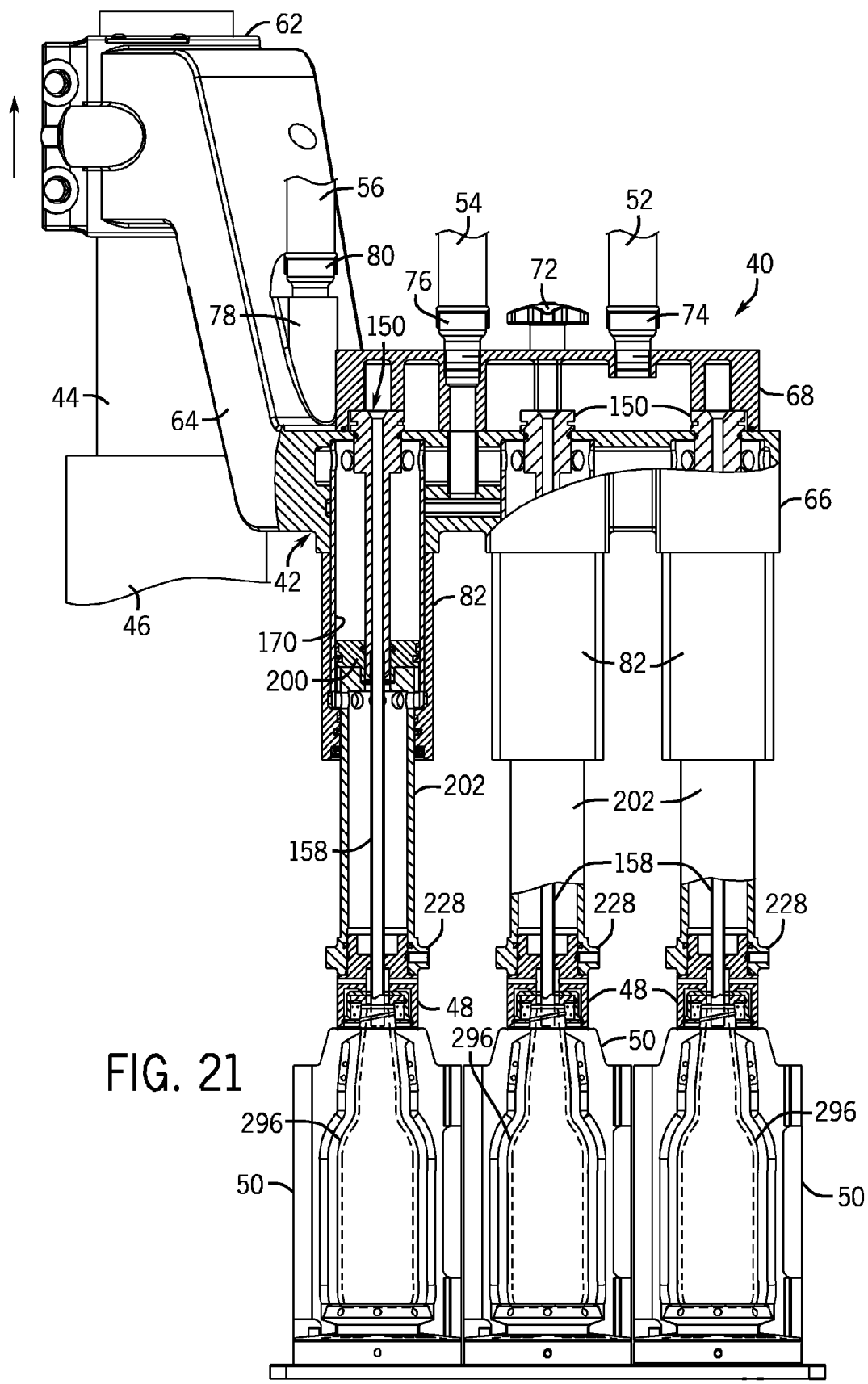
FIG. 21 is a figure similar to the one illustrated in FIG. 20, with the blow head arm raised to a fifth position identical to its position as illustrated in FIG. 17 with the blow heads are remaining on the respective blow molds to keep the respective blow heads engaged with the respective finishes of the blown parisons and the distal ends of the cooling tubes being located just inside the bore inside the finish of the respective blown parisons.

Referring next to FIG. 21, the blow head arm assembly 42 has been raised by the blow head lift mechanism 46 back to its second position, with the blow heads 48 remaining in place upon the blow molds 50 and in engagement with the finishes 292. The pistons 200 have been dropped back to again contact the stops 176 in the interior of the sleeves 170 at the bottom end thereof (shown in FIG. 7). The bottoms or distal ends of the bottom portions 158 of the cooling tubes 150 have risen to a position near the bottom of the blow heads 48 (and thus near the bottoms of the finishes of the blown parison 296). It will be appreciated by those skilled in the art that the blow head arm assembly 42 may repeatedly oscillate between its second and fourth positions at any desired speed, for any desired number of times, and may temporarily stop anywhere in this cycle, as desired to achieve a preferred cooling cycle. If desired, the cooling air pressure supplied to the cooling tubes 150 may be varied as the position of the cooling tubes 150 within the blown parisons 296 is varied.

Referring finally to FIG. 22, the blow head arm assembly 42 has been raised by the blow head lift mechanism 46 back to its first position, with the blow heads 48 being lifted upwardly away from the finishes 292. The pistons 200 have been dropped back to again contact the stops 176 in the interior of the sleeves 170 at the bottom end thereof (shown in FIG. 7), and the bottoms or distal ends of the bottom portions 158 of the cooling tubes 150 remain near the bottom of the blow heads 48.

Typically, air pressure is made available to the long stroke blow head mechanism 40 of the present invention at pressures up to 5 bar. Typical ranges for final blow air from the first pressurized air source 52 are from 1 to 5 bar, typical ranges for cooling air from the first pressurized air source 52 are from 0 to 5 bar, typical ranges for finish cooling air from the second pressurized air source 54 are from 1 to 5 bar, and typical ranges of air pressure from the third pressurized air source 56 used to pressurize the piston 200 in the sleeve 170 are from 0 to 5 bar. Nominal pressures viewed as being optimal at the present time for production of a 12 oz. beer bottle are a 2.25 bar final blow pressure, a 3.5 bar cooling pressure, a 2.25 bar finish cooling pressure, and a 2.25 bar pressure on the piston 200 (which in an exemplary embodiment has a surface area of 4.4 square inches, thus translating to a downward force of approximately 145.2 pounds.

It may therefore be appreciated from the above detailed description of the exemplary embodiments of the present invention that it teaches a long stroke blow head mechanism that has a substantially reduced mechanical complexity. In this regard, the long stroke blow head mechanism of the present invention entirely eliminates the need for the motor and its accompanying mechanical drive mechanism on the blow head arm to raise and lower cooling tubes. In doing so, the long stroke blow head mechanism of the present invention retains all of the functionality of such motorized drive mechanisms.

The long stroke blow head mechanism of the present invention facilitates movement of the cooling tube into a glass container after it is blown to enhance the cooling of the blown glass container. During such movement of the cooling tube, the long stroke blow head mechanism of the present invention maintains a uniform force on the blow head to keep the blow head on the blow mold and engaged with the finish of the glass container to continue cooling it without placing undue stress on it as the cooling tube is lowered into the glass container. Despite the inclusion of such functionality, the long stroke blow head mechanism of the present invention features simplicity of operation while being of relatively compact size.

The long stroke blow head mechanism of the present invention is of a construction which is both durable and long lasting, and which will require little or no maintenance to be provided by the user throughout its operating lifetime. The long stroke blow head mechanism of the present invention is also of inexpensive construction relative to previously known apparatus of its kind to enhance its market appeal and to thereby afford it the broadest possible market. Finally, all of the aforesaid advantages of the long stroke blow head mechanism of the present invention are achieved without incurring any substantial relative disadvantage.

Although the foregoing description of the long stroke blow head mechanism of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

What is claimed is:

1. A blow head mechanism for use in blowing and cooling a parison in a blow mold, said blow head mechanism comprising:
    a blow head arm;
    a blow head lift mechanism for selectively raising and lowering said blow head arm between at least a first position, a second position that is lower than said first position, and a third position that is lower than said second position;
    a blow head support apparatus having a first end mounted on a bottom side of said blow head arm and an opposite second end extending downwardly therefrom, said blow head support apparatus having extended and contracted configurations and being biased from said contracted configuration toward said extended configuration;
    a blow head mounted under said second end of said blow head support apparatus; and
    a cooling tube having a first end and an opposite second end, said first end of said cooling tube being fixedly mounted from said blow head arm, said second end of said cooling tube extending downwardly through an aperture in said blow head;
    wherein when said blow head arm is in said first position said blow head is located above the finish of a parison in the blow mold; and
    wherein when said blow head arm is in said second position said blow head is located in engagement with the finish of the parison in the blow mold and the second end of said cooling tube is located proximate the top of the blow mold; and
    wherein when said blow head arm is in said third position said blow head remains located in engagement with the finish of the parison in the blow mold and the second end of said cooling tube is located below the top of the blow mold within the parison.

2. A blow head mechanism as defined in claim 1, wherein said blow head lift mechanism comprises:
    a servo motor mechanism which selectively raises and lowers said blow head arm with respect to the blow mold.

3. A blow head mechanism as defined in claim 1, wherein said blow head lift mechanism is operable to position said blow head arm at any position intermediate said first, second, and third positions.

4. A blow head mechanism as defined in claim 1, additionally comprising:
    a first air supply hose for supplying air from a first pressurized source to a first inlet on said blow head arm; and
    a first air passage within said blow head arm in fluid communication between said first inlet and said first end of said cooling tube to supply final blow air and cooling air to the parison in the blow mold.

5. A blow head mechanism as defined in claim 4, wherein said blow head arm comprises:
    a lower blow head arm member having a cooling tube seat located therein, wherein said first end of said cooling tube is seated in said cooling tube seat in said lower blow head arm member; and
    a blow head arm cap which is removably installed onto said lower blow head arm member, said blow head arm cap retaining said first end of said cooling tube in said cooling tube seat when said blow head arm cap which is installed onto said lower blow head arm member, said cooling tube being removable from said lower blow head arm member when said blow head arm cap which is removed from said lower blow head arm member; and
    wherein said first air passage comprises:
        a first air chamber located intermediate said blow head arm cap and said lower blow head arm member, said first air chamber being in fluid communication intermediate said first inlet and said first end of said cooling tube.

6. A blow head mechanism as defined in claim 1, additionally comprising:
    a second air supply hose for supplying air from a second pressurized source to a second inlet on said blow head arm; and
    a second air passage within said blow head arm and said blow head support apparatus in fluid communication between said second inlet and said blow head to supply finish cooling air to said blow head.

7. A blow head mechanism as defined in claim 6, wherein said second air passage comprises:
    an air passageway located within said blow head arm in fluid communication between said second inlet and a cooling outlet on said blow head arm; and
    a variable length air passageway located within said blow head support apparatus between a cooling inlet in said blow head support apparatus at said first end thereof and a cooling outlet located at said second end thereof through which cooling air is supplied to said blow head.

8. A blow head mechanism as defined in claim 1, additionally comprising:
    a third air supply hose for supplying air from a third pressurized source to a third inlet on said blow head arm; and
    a third air passage within said blow head arm to supply air pressure to said blow head support apparatus at said first end thereof to bias said blow head support apparatus from said contracted configuration toward said extended configuration.

9. A blow head mechanism as defined in claim 8, wherein said blow head support apparatus comprises:
- a cylinder having a proximal end and an opposite distal end, said proximal end of said cylinder comprising said first end of said blow head support apparatus and being fixedly mounted on said bottom side of said blow head arm, said third air passage in said blow head arm communicating with said proximal end of said cylinder, said distal end of said cylinder extending downwardly and being open;
- a slider member having a proximal end and an opposite distal end, said proximal end of said slider member having a piston attached thereto which piston is located within said cylinder, said distal end of said slider member comprising said second end of said blow head support apparatus and having said blow head mounted thereupon, wherein air pressure within said cylinder exerts pressure upon said piston and biases slider member downwardly to cause said blow head support apparatus to be biased from said contracted configuration toward said extended configuration.

10. A blow head mechanism as defined in claim 1, wherein said second end of said cooling tube is located proximate the bottom of said blow head when said blow head arm is located in said first position, intermediate said first and second positions, or in said second position.

11. A blow head mechanism as defined in claim 1, wherein said second end of said cooling tube is located proximate the bottom of said blow head and within the finish of the parison when said blow head arm is located in said second position; and
- of the way from the top of the blown parison to the bottom of the blown parison
- wherein said second end of said cooling tube moves from a location within the finish of the parison downwardly to a location proximate the midpoint of the parison or below as said blow head arm is moved from said second position to said third position.

12. A blow head mechanism as defined in claim 1, additionally comprising:
- at least one additional blow head support apparatus having a first end mounted on a bottom side of said blow head arm and an opposite second end extending downwardly therefrom, said at least one additional blow head support apparatus having extended and contracted configurations and being biased from said contracted configuration toward said extended configuration;
- at least one additional blow head mounted under said second end of said at least one additional blow head support apparatus; and
- at least one additional cooling tube having a first end and an opposite second end, said first end of said at least one additional cooling tube being fixedly mounted from said blow head arm, said second end of said at least one additional cooling tube extending downwardly through an aperture in at least one additional said blow head;
wherein when said blow head arm is in said first position said at least one additional blow head is located above the finish of a second parison in a second blow mold; and
wherein when said blow head arm is in said second position said at least one additional blow head is located in engagement with the finish of the second parison in the second blow mold and the second end of said at least one additional cooling tube is located proximate the top of the second blow mold; and
wherein when said blow head arm is in said third position said at least one additional blow head remains located in engagement with the finish of the second parison in the second blow mold and the second end of said at least one additional cooling tube is located below the top of the second blow mold within the second parison.

13. A blow head mechanism as defined in claim 1, wherein said blow head support apparatus is arranged and configured to cause said blow head to remain located in engagement with the finish of the parison in the blow mold whenever said blow head arm is located in said second position, intermediate said second and third positions, and in said third position.

14. A blow head mechanism as defined in claim 1, wherein said blow head support apparatus is biased from said contracted configuration toward said extended configuration with an adjustable amount of force.

15. A blow head mechanism as defined in claim 1, wherein said blow head arm and said cooling tube are respectively arranged and configured so that said second end of said cooling tube moves upwardly and downwardly the exact same amount as said blow head arm is operated to move upwardly and downwardly.

16. A blow head mechanism for use in blowing and cooling a parison in a blow mold, said blow head mechanism comprising:
- a blow head arm;
- a blow head lift mechanism for selectively raising and lowering said blow head arm between at least a first position, a second position that is lower than said first position, and a third position that is lower than said second position;
- a blow head support apparatus having a first end mounted on a bottom side of said blow head arm and an opposite second end extending downwardly therefrom, said blow head support apparatus having extended and contracted configurations and being biased from said contracted configuration toward said extended configuration;
- a blow head mounted under said second end of said blow head support apparatus; and
- a cooling tube having a first end and an opposite second end, said first end of said cooling tube being fixedly mounted from said blow head arm, said second end of said cooling tube extending downwardly through an aperture in said blow head;
- a first air passage within said blow head arm to supply air from a first inlet on said blow head arm to said first end of said cooling tube to supply final blow air and cooling air to the parison in the blow mold;
- a second air passage within said blow head arm and said blow head support apparatus to supply finish cooling air from a second inlet on said blow head arm to said blow head;
- a third air passage within said blow head arm to supply pressurized air from a third inlet on said blow head arm to said blow head support apparatus at said first end thereof to bias said blow head support apparatus from said contracted configuration toward said extended configuration;
wherein when said blow head arm is in said first position said blow head is located above the finish of a parison in the blow mold; and
wherein when said blow head arm is in said second position said blow head is located in engagement with the finish of the parison in the blow mold and the second end of said cooling tube is located proximate the top of the blow mold; and
wherein when said blow head arm is in said third position said blow head remains located in engagement with the finish of the parison in the blow mold and the second end of said cooling tube is located below the top of the blow mold within the parison.

17. A blow head mechanism for use in blowing and cooling a parison in a blow mold, said blow head mechanism comprising:
- a blow head arm;
- a blow head lift mechanism for selectively raising and lowering said blow head arm;
- a blow head support apparatus mounted under said blow head arm and having a blow head mounted on a bottom end thereof, said blow head support apparatus having extended and contracted configurations and being biased from said contracted configuration toward said extended configuration; and
- a cooling tube having an end fixedly mounted from said blow head arm and a lower end extending downwardly through an aperture in said blow head;

wherein when said blow head arm is in an upward position said blow head is located above the finish of a parison in the blow mold; and
wherein when said blow head arm is in an intermediate position said blow head is located in engagement with the finish of the parison in the blow mold and the lower end of said cooling tube is located proximate the top of the blow mold; and
wherein when said blow head arm is in a lowered position said blow head remains located in engagement with the finish of the parison in the blow mold and the lower end of said cooling tube is located below the top of the blow mold within the parison.

18. A method for operating a blow head mechanism to blow and cool a parison in a blow mold, said method comprising:
- supporting a blow head at a bottom end of a blow head support apparatus having an opposite top end mounted on a bottom side of a blow head arm, said blow head support apparatus having extended and contracted configurations, said blow head arm having a cooling tube having a top end fixedly mounted from said blow head arm, said cooling tube also having an opposite bottom end extending downwardly through an aperture in said blow head;
- biasing said blow head support apparatus from said contracted configuration toward said extended configuration; and
- selectively raising and lowering said blow head arm with a blow head lift mechanism between at least a first position in which said blow head is located above the finish of a parison in the blow mold, a second position that is lower than said first position in which said blow head is located in engagement with the finish of the parison in the blow mold and the second end of said cooling tube is located proximate the top of the blow mold, and a third position that is lower than said second position in which said blow head remains located in engagement with the finish of the parison in the blow mold and the second end of said cooling tube is located below the top of the blow mold within the parison.

* * * * *

UNITED STATES PATENT AND TRADEMARK OFFICE
CERTIFICATE OF CORRECTION

| | | |
|---|---|---|
| PATENT NO. | : 8,117,870 B2 | |
| APPLICATION NO. | : 12/565987 | |
| DATED | : February 21, 2012 | |
| INVENTOR(S) | : Timothy A. Ringuette | |

It is certified that error appears in the above-identified patent and that said Letters Patent is hereby corrected as shown below:

Column 6, Line 63:

"and a second pressurized air source that will supply finish" should read --and a second pressurized air source 54 that will supply finish--.

Column 7, Line 25:

"over the distal half of the lower blow head arm member is a" should read --over the distal half of the lower blow head arm member 66 is a--.

Column 12, Line 57:

"screwing the grips 70 and (best shown in FIG. 15) onto two" should read --screwing the grips 70 and 72 (best shown in FIG. 15) onto two--.

Column 14, Line 67:

"heads and the bottoms or distal ends of the bottom portions" should read --heads 48 and the bottoms or distal ends of the bottom portions--.

Signed and Sealed this
Twenty-fourth Day of April, 2012

David J. Kappos
*Director of the United States Patent and Trademark Office*